(12) United States Patent
Duan et al.

(10) Patent No.: US 12,314,707 B2
(45) Date of Patent: May 27, 2025

(54) PRE-TRAINING FOR AUTOMATING CODE REVIEW ACTIVITIES

(71) Applicant: MICROSOFT TECHNOLOGY LICENSING, LLC., Redmond, WA (US)

(72) Inventors: Nan Duan, Beijing (CN); Shengyu Fu, Redmond, WA (US); Shuai Lu, Beijing (CN); Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 334 days.

(21) Appl. No.: 17/985,849

(22) Filed: Nov. 12, 2022

(65) Prior Publication Data

US 2024/0160435 A1    May 16, 2024

(51) Int. Cl.
*G06F 8/71*       (2018.01)
*G06N 3/08*       (2023.01)

(52) U.S. Cl.
CPC ............... *G06F 8/71* (2013.01); *G06N 3/08* (2013.01)

(58) Field of Classification Search
CPC .... G06N 3/08; G06F 8/71; G06F 8/33; G06F 8/34
See application file for complete search history.

(56) References Cited

U.S. PATENT DOCUMENTS

| | | | |
|---|---|---|---|
| 10,503,631 B1 * | 12/2019 | Talluri | G06F 11/3636 |
| 11,150,877 B2 | 10/2021 | Ivankovic | |
| 11,604,626 B1 | 3/2023 | Sawant | |
| 2014/0196010 A1 * | 7/2014 | Balachandran | G06F 8/71 717/124 |
| 2019/0228319 A1 | 7/2019 | Gupta et al. | |
| 2020/0249918 A1 | 8/2020 | Svyatkovskiy et al. | |
| 2020/0293617 A1 | 9/2020 | Luo | |
| 2020/0341755 A1 * | 10/2020 | Woulfe | G06Q 10/063112 |
| 2021/0019249 A1 * | 1/2021 | Gnaneswaran | G06N 20/20 |
| 2021/0357307 A1 | 11/2021 | Deng et al. | |
| 2022/0164626 A1 | 5/2022 | Bird | |

(Continued)

FOREIGN PATENT DOCUMENTS

WO    2019143539 A1    7/2019

OTHER PUBLICATIONS

International Search Report and Written Opinion received for PCT Application No. PCT/US23/036827, mailed on Feb. 16, 2024, 17 pages.

(Continued)

*Primary Examiner* — S. Sough
*Assistant Examiner* — Cheneca Smith

(57) ABSTRACT

A deep learning model is pre-trained with a large-scale of unsupervised data of code review tasks in order to learn the relationships between code changes and a code review. The pre-trained deep learning model predicts a code review given a code diff hunk in a code diff format. The code diff hunk includes the changed code and its surrounding context. The pre-trained deep learning model may then be fine-tuned with supervised data in order to make predictions for several code review activities, such as, code change quality estimation and code refinement.

19 Claims, 11 Drawing Sheets

(56) References Cited

U.S. PATENT DOCUMENTS

2024/0184570 A1 6/2024 Fu
2025/0068419 A1 2/2025 Fu

OTHER PUBLICATIONS

Non-Final Office Action mailed on Apr. 11, 2024, in U.S. Appl. No. 18/074,994, 20 pages.
Ackerman, et al., "Software Inspections and the Industrial Production of Software", In Proceedings of a Symposium on Software Validation: Inspection-Testing-Verification-Alternatives, Oct. 1, 1984.
Beller, et al., "Modern code reviews in open-source projects: which problems do they fix?", In Proceedings of Working Conference on Mining Software Repositories, May 31, 2014, 10 Pages.
Brown, et al., "Language models are few-shot learners", In Proceedings of the 34th International Conference on Neural Information Processing Systems, Dec. 6, 2020, 25 Pages.
Chiang, et al., "Breaking Down Multilingual Machine Translation", In Journal of Computing Research Repository, Oct. 15, 2021, 15 Pages.
Chouchen, et al., "WhoReview: A multi-objective search-based approach for code reviewers recommendation in modern code review", In Journal of Applied Soft Computing, vol. 100, Mar. 2021.
Fagan, Michaele. , "A History of Software Inspections", In Journal of Software Pioneers, Oct. 21, 2011.
Fagan, Michaele. , "Design and Code Inspections to Reduce Errors in Program Development", In Journal of IBM Systems Journal, vol. 15, Issue 3, 1976.
Guo, et al., "GraphCodeBert: Pre-Training Code Representations with Data Flow", In Proceedings of International Conference on Learning Representations, May 3, 2021, 18 Pages.
Wang, et al., "CodeT5: Identifier-aware Unified Pre-trained Encoder-Decoder Models for Code Understanding and Generation", In Repository of arXiv: 2109.00859, Sep. 2, 2021, 13 Pages.
Shuai Lu, "CodeBERT", Retrieved From: https://github.com/microsoft/CodeBERT/tree/master/CodeReviewer, Aug. 8, 2022, 4 Pages.
"From Research to Production", Retrieved From: https://pytorch.org/, Retrieved On: Nov. 25, 2022, 4 Pages.
"Gerrit Code Review", Retrieved From: https://www.gerritcodereview.com/, Retrieved On: Nov. 25, 2022, 3 Pages.
"Let's build from here", Retrieved From: https://github.com/, Retrieved On: Nov. 25, 2022, 14 Pages.
"The AI community building the future", Retrieved From: https://huggingface.co/, Retrieved On: Nov. 25, 2022, 8 Pages.
Li, et al., "Automating code review activities by large-scale pre-training", In Proceedings of the 30th ACM Joint European Software Engineering Conference and Symposium on the Foundations of Software Engineering, Nov. 9, 2022, pp. 1035-1047.
Notice of Allowance mailed on Aug. 7, 2024, in U.S. Appl. No. 18/074,994, 12 pages.
Allamanis, et al., "Self-Supervised Bug Detection and Repair", In Proceedings of 35th Conference on Neural Information Processing Systems, Dec. 6, 2021, 12 Pages.
Chen, et al., "Sequencer: Sequence-to-Sequence Learning for End-to-End Program Repair", In Journal of IEEE Transactions on Software Engineering, Sep. 10, 2019, 17 Pages.
Dinella, et al., "DeepMerge: Learning to Merge Programs", In Repository of arXiv:2105.07569v3, Sep. 6, 2021, 12 Pages.
Hoang, et al., "CC2Vec Distributed Representations of Code Changes", In Proceedings of the 2023 CHI conference on human factors in computing systems, Jun. 27, 2020, pp. 518-529.
Hong, et al., "CommentFinder: A Simpler, Faster, More Accurate Code Review Comments Recommendation", In Proceedings of the 30th ACM Joint European Software Engineering Conference and Symposium on the Foundations of Software Engineering, Nov. 14, 2022, pp. 507-519.
International Search Report and Written Opinion received for PCT Application No. PCT/US2024/042595, Nov. 25, 2024, 14 pages.
Jin, et al., "InferFix: End-to-End Program Repair with LLMs", Proceedings of the 31st ACM Joint European Software Engineering Conference and Symposium on the Foundations of Software Engineering, Mar. 13, 2023, pp. 1646-1656.
Lu, et al., "LLaMA-Reviewer: Advancing Code Review Automation with Large Language Models through Parameter-Efficient Fine-Tuning", In Repository of arXiv:2308.11148v2, Sep. 5, 2023, 12 Pages.
Svyatkovskiy, et al, "MergeBERT: Program Merge Conflict Resolution via Neural Transformers," Sep. 8, 2021, 16 pages.
Zhang, et al., "BERTScore: Evaluating text generation with BERT", In Proceedings of Eighth International Conference on Learning Representations, Apr. 26, 2020, pp. 1-43.
"GitHub Copilot", Retrieved from: https://web.archive.org/web/20210927023930/https://copilot.github.com/, Sep. 27, 2021, 16 Pages.
Ackerman, et al., "Software Inspections and the Industrial Production of Software", In Proceedings of a Symposium on Software Validation: Inspection-Testing-Verification-Alternatives, Oct. 1, 1984, pp. 13-40.
Ahmad, et al., "Unified Pre-Training for Program Understanding and Generation", In Proceedings of Conference of the North American Chapter of the Association for Computational Linguistics: Human Language Technologies, Jun. 6, 2021, pp. 2655-2668.
Bacchelli, et al., "Expectations, Outcomes, and Challenges of Modern Code Review", In Proceedings of the 35th International Conference on Software Engineering, May 18, 2013, pp. 712-721.
Beller, et al., "Modern code reviews in open-source projects: which problems do they fix?", In Proceedings of Working Conference on Mining Software Repositories, May 21, 2014, 10 Pages.
Borgeaud, et al., "Improving language models by retrieving from trillions of tokens", In Proceedings of the 39th International Conference on Machine Learning, vol. 162, Jun. 28, 2022, 35 Pages.
Bosu, et al., "Impact of Peer Code Review on Peer Impression Formation: A Survey", In Proceedings ACM/IEEE International Symposium on Empirical Software Engineering and Measurement, Oct. 10, 2013, pp. 133-142.
Brown, et al., "Language models are few-shot learners", In Proceedings of the 34th International Conference on Neural Information Processing Systems, Dec. 6, 2020, pp. 1-75.
Chen, et al., "Evaluating Large Language Models Trained on Code", In Repository of arXiv:2107.03374v2, Jul. 14, 2021, 35 Pages.
Chiang, et al., "Breaking Down Multilingual Machine Translation", In Findings of the Association for Computational Linguistics: ACL 2022, May 22, 2022, pp. 2766-2780.
Chouchen, et al., "WhoReview: A multi-objective search-based approach for code reviewers recommendation in modern code review", In Journal of Applied Soft Computing, vol. 100, Nov. 30, 2020, pp. 1-13.
Devanbu, et al., "Deep learning & software engineering: State of research and future directions", In Repository of arXiv:2009.08525v1, Sep. 17, 2020, pp. 1-37.
Devlin, et al., "BERT: Pre-training of Deep Bidirectional Transformers for Language Understanding", In Repository of arXiv:1810.04805v1, Oct. 11, 2018, 14 Pages.
Fagan, Michaele. , "A History of Software Inspections", In Journal of Software Pioneers, Oct. 21, 2011, pp. 562-573.
Fagan, Michaele. , "Design and Code Inspections to Reduce Errors in Program Development", In Journal of IBM Systems Journal, vol. 15, Issue 3, 1976, pp. 575-607.
Feng, et al., "Codebert: A Pre-Trained Model for Programming and Natural Languages", In Proceedings of the Conference on Empirical Methods in Natural Language Processing: Findings, EMNLP, Nov. 16, 2020, pp. 1536-1547.
Guo, et al., "GraphCodeBert: Pre-Training Code Representations with Data Flow", In Proceedings of International Conference on Learning Representations, 2021, 18 Pages.
Guo, et al., "UniXcoder: Unified Cross-Modal Pre-training for Code Representation", In Repository of arXiv:2203.03850v1, Mar. 8, 2022, 14 Pages.
Gupta, et al., "Intelligent code reviews using deep learning", In Proceedings of the 24th ACM SIGKDD International Conference on Knowledge Discovery & Data Mining, Aug. 20, 2018, 9 Pages.

(56) References Cited

OTHER PUBLICATIONS

Hellendoorn, et al., "Towards Automating Code Review at Scale", In Proceedings of the 29th ACM Joint Meeting on European Software Engineering Conference and Symposium on the Foundations of Software Engineering, Aug. 23, 2021, pp. 1479-1482.

Heumüller, et al., "Exploit Those Code Reviews! Bigger Data for Deeper Learning", In Proceedings of the 29th ACM Joint Meeting on European Software Engineering Conference and Symposium on the Foundations of Software Engineering, Aug. 23, 2021, pp. 1505-1509.

Hindle, et al., "On the Naturalness of Software", In Journal of Communications of the ACM, vol. 59, Issue 5, May 2016, pp. 122-131.

Husain, et al., "CodeSearchNet Challenge: Evaluating the State of Semantic Code Search", In Journal of Computing Research Repository, Sep. 20, 2019, 6 Pages.

Kanade, et al., "Learning and Evaluating Contextual Embedding of Source Code", In Proceedings of 37th International Conference on Machine Learning, Jul. 13, 2020, 12 Pages.

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.

Li, et al., "CodeReviewer: Pre-Training for Automating Code Review Activities", In Repository of arXiv:2203.09095v2, Oct. 11, 2022, 13 Pages.

Li, et al., "Deepreview: automatic code review using deep multi-instance learning", In Proceedings of Pacific-Asia Conference on Knowledge Discovery and Data Mining, Apr. 14, 2019, pp. 318-330.

Liu, et al., "ROBERTa: A Robustly Optimized BERT Pretraining Approach", In Repository of arXiv:1907.11692v1, Jul. 26, 2019, 13 Pages.

Liu, et al., "CodeXGLUE: A Machine Learning Benchmark Dataset for Code Understanding and Generation", In Proceedings of 35th Conference on Neural Information Processing Systems Track on Datasets and Benchmarks, Jun. 3, 2021, 16 Pages.

Mukadam, et al., "Gerrit software code review data from android", In Proceedings of 10th Working Conference on Mining Software Repositories, May 18, 2013, pp. 45-48.

Paixao, et al., "CROP: Linking Code Reviews to Source Code Changes", In Proceedings of IEEE/ACM 15th International Conference on Mining Software Repositories, May 27, 2018, pp. 46-49.

Papineni, et al., "BLEU: a method for automatic evaluation of machine translation", In Proceedings of the 40th Annual Meeting on Association for Computational Linguistics, Jul. 7, 2002, pp. 311-318.

Raffel, et al., "Exploring the Limits of Transfer Learning with a Unified Text-to-Text Transformer", In Journal of Machine Learning Research, vol. 21, Issue 140, Jun. 21, 2020, pp. 1-67.

Rigby, et al., "Convergent contemporary software peer review practices", In Proceedings of the 2013 9th joint meeting on foundations of software engineering, Aug. 18, 2013, pp. 202-212.

Sadowski, et al., "Modern code review: a case study at google", In Proceedings of IEEE/ACM 40th International Conference on Software Engineering: Software Engineering in Practice Track, May 30, 2018, pp. 181-190.

Shi, et al., "Automatic code review by learning the revision of source code", In Proceedings of the AAAI Conference on Artificial Intelligence, vol. 33, Issue 1, Jul. 17, 2019, pp. 4910-4917.

Siow, et al., "CORE: Automating Review Recommendation for Code Changes", In Proceedings of IEEE 27th International Conference on Software Analysis, Evolution and Reengineering, Feb. 18, 2020, pp. 284-295.

Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, pp. 1433-1443.

Thongtanunam, et al., "Who should review my code? A file location-based code-reviewer recommendation approach for Modern Code Review", In Proceedings of IEEE 22nd International Conference on Software Analysis, Evolution, and Reengineering, Mar. 2, 2015, pp. 141-150.

Tufano, et al., "An Empirical Study on Learning Bug-Fixing Patches in the Wild via Neural Machine Translation", In Journal of ACM Transactions on Software Engineering and Methodology, vol. 24, Issue 4, Sep. 2019, 29 Pages.

Tufano, et al., "Towards Automating Code Review Activities", In Proceedings of IEEE/ACM 43rd International Conference on Software Engineering, May 22, 2021, pp. 163-174.

Tufano, et al., "Using Pre-Trained Models to Boost Code Review Automation", In Repository of arXiv:2201.06850v1, Jan. 18, 2022, pp. 1-12.

Tufano, et al., "Using pre-trained models to boost code review automation", In Proceedings IEEE/ACM 44th International Conference on Software Engineering, May 25, 2022, pp. 2291-2302.

Vaswani, et al., "Attention is All You Need", In Proceedings of Advances in Neural Information Processing Systems, vol. 30, Dec. 4, 2017, 11 Pages.

Wang, et al., "CodeT5: Identifier-aware Unified Pre-trained Encoder-Decoder Models for Code Understanding and Generation", In Proceedings of the 2021 Conference on Empirical Methods in Natural Language Processing, Nov. 7, 2021, pp. 8696-8707.

Watson, et al., "A Systematic Literature Review on the Use of Deep Learning in Software Engineering Research", In Journal of ACM Transactions on Software Engineering and Methodology, vol. 31, Issue 2, Mar. 4, 2022, 58 Pages.

Yang, et al., "Mining the modern code review repositories: a dataset of people, process and product", In Proceedings of IEEE/ACM 13th Working Conference on Mining Software Repositories, May 14, 2022, pp. 460-463.

Zanjani, et al., "Automatically recommending peer reviewers in modern code review", In Journal of IEEE Transactions on Software Engineering, vol. 42, Issue 6, Nov. 12, 2015, pp. 530-543.

Zhu, et al., "Multilingual Code Snippets Training for Program Translation", In Proceedings of the AAAI Conference on Artificial Intelligence, vol. 36, Issue 10, Jun. 28, 2022, pp. 11783-11790.

"CodeBERT", Retrieved From: https://github.com/microsoft/CodeBERT/tree/master/CodeReviewer, Retrieved On: Nov. 25, 2022, 4 Pages.

"Code Generation on Humaneval—State-of-the-art," Retrieved from the Link: https://paperswithcode.com/sota/code-generation-on-humaneval, 2024, Accessed on Feb. 27, 2024, 25 pages.

Wang, et al., "Glue: A Multi-Task Benchmark and Analysis Platform for Natural Language Understanding", In Proceedings of the EMNLP Workshop BlackboxNLP: Analyzing and Interpreting Neural Networks for NLP, Nov. 1, 2018, 3 pages.

Tufano, Michele., "AutoDev: Automated AI-Driven Development", Microsoft, Feb. 2, 2024, 3 pages.

"Open AI. GPT-4 Technical Report", arXiv:2303.08774, Mar. 15, 2023, 99 pages.

Achiam, et al., OPENAI, Gpt-4 Technical Report, Mar. 4, 2024, 100 pages.

Agarwal, et al., "Copilot Evaluation Harness: Evaluating llm-Guided Software programming," Feb. 22, 2024, 14 pages.

Smith, et al., "Using DeepSpeed and Megatron to Train Megatron-Turing NLG 530B, A Large-Scale Generative Language Model," 2022, 44 pages.

Chen, et al., "Vscuda: Llm Based Cuda Extension for Visual Studio Code," In Proceedings of the SC'23 Workshops of The International Conference on High Performance Computing, Network, Storage, and Analysis, NewYork, NY, USA, SC-W'23, Association for Computing Machinery, 2023, pp. 11-17.

Ding, et al., "CrossCodeEval: A Diverse and Multilingual Benchmark for Cross-File Code Completion," Advances in Neural Information Processing Systems, 36, 2023, 23 pages.

Floridi, et al., "Gpt-3: Its Nature, Scope, Limits, and Consequences. Minds and Machines," vol. 30, 2020, pp. 681-694.

Gravitas, et al., "Autogpt," Retrieved from Link: https://github.com/Significant-Gravitas/AutoGPT, GitHub Repository, 2024, 4 Pages.

Srivastava, et al., "Beyond the Imitation Game: Quantifying and Extrapolating the Capabilities of Language Models," 2023, pp. 1-95.

(56) References Cited

OTHER PUBLICATIONS

Nam, et al., "In-IDE Generation-based Information Support with a Large Language Model," 2023, pp. 1-15.
Ouyang, et al., "Training Language Models to Follow Instructions with Human Feedback," Advances in Neural Information Processing Systems, vol. 35, Mar. 4, 2022, pp. 27730-2774.
Rae, et al., "Scaling Language Models: Methods, Analysis Insights from Training Gopher," 2022, 120 pages.
Roziere, et al., "Code Llama: Open Foundation Models for Code," arXiv preprint arXiv:2308.12950, 2023, 48 pages.
Shinn, et al., "Reflexion: Language Agents with Verbal Reinforcement Learning," 2023, 19 pages.

* cited by examiner

Code Change Quality Estimation Results 1100

| Model (# Layers) | Precision | Recall | F1 | Accuracy |
|---|---|---|---|---|
| Transformer (12) | 74.50 | 46.07 | 56.93 | 65.16 |
| T5 (6) | 70.82 | 57.20 | 63.29 | 66.82 |
| CodeT5 (12) | 70.36 | 58.96 | 64.16 | 67.07 |
| CodeReviewer (12) | 78.60 | 65.63 | 71.53 | 73.89 |

*FIG. 11A*

Code Review Comment Generation Results 1102

| Model (# Layers) | Test Set | Human Evaluation Set | |
|---|---|---|---|
| | BLEU | Information | Relevance |
| Transformer (12) | 4.76 | 3.08 | 2.5 |
| T5 (6) | 4.39 | 2.54 | 1.62 |
| CodeT5 (12) | 4.83 | 3.03 | 2.40 |
| CodeReviewer (12) | 5.32 | 3.60 | 3.20 |

*FIG. 11B*

Code Refinement Results 1104

| Model (# Layers) | BLEU | ExactMatch |
|---|---|---|
| NativeCopy | 58.75 | 0.00 |
| T5 (6) | 77.03 | 15.08 |
| CodeT5 (12) | 80.82 | 24.41 |
| CodeReviewer (12) | 82.61 | 30.32 |

*FIG. 11C*

PRE-TRAINING FOR AUTOMATING CODE REVIEW ACTIVITIES

BACKGROUND

Code or peer review is a process that is often utilized during software development where the source code under development is reviewed by one or more peers of the author of the source code. The source code is often inspected to discover errors, to ensure that the source code complies with best practice standards and to discover vulnerabilities, such as race conditions, malware, memory leaks, buffer overflows, format string exploits, and the like. Code review is used to find these problems which may have been overlooked in the development of the source code before the software is released.

Code review is often performed manually requiring a peer to spend a significant amount of time to understand the source code program and to review the source code. Code review requires a peer to understand the source code program's logic, functionality, style and other factors. When the code review process is performed manually, it is subject to human errors. The peer reviewer may miss very obvious errors in the source code or waste time reviewing and commenting on source code not in error.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A deep learning model is generated through large-scale pre-training of the model with a variety of unsupervised code review training datasets derived from different code review tasks. The pre-trained deep learning model learns the relationships between code changes and code reviews in order to make predictions for several code review activities, such as, code diff quality estimation, code review generation and code refinement. The pre-trained deep learning model learns the relationships between changed source code and code review comments from a training on unsupervised pre-training datasets that include denoising code diff tags, denoising code diffs, denoising code reviews and pairs of changed code with an associated review comment.

The pre-trained deep learning model may then be used for review comment prediction given the code diff of a changed code with its surrounding context (i.e., code diff hunk). The pre-trained deep learning model may then be fine-tuned with a fine-tuning dataset of triplets that include an original source code, its code review, and the changed code to generate a code refinement model. The code refinement model predicts the modified source code for a given original source code snippet and its code review.

The encoder portion of the pre-trained deep learning model may then be fine-tuned for code quality estimation classification. Code quality estimation classification identifies whether or not a code diff hunk needs a code review. The fine-tuning dataset consists of code diff hunks and a label that indicates whether or not the changed code needs a code review.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 11A-11C are a depiction of experimental results showing the technical improvement of pre-training on code review tasks.

DETAILED DESCRIPTION

Overview

Figure 1:
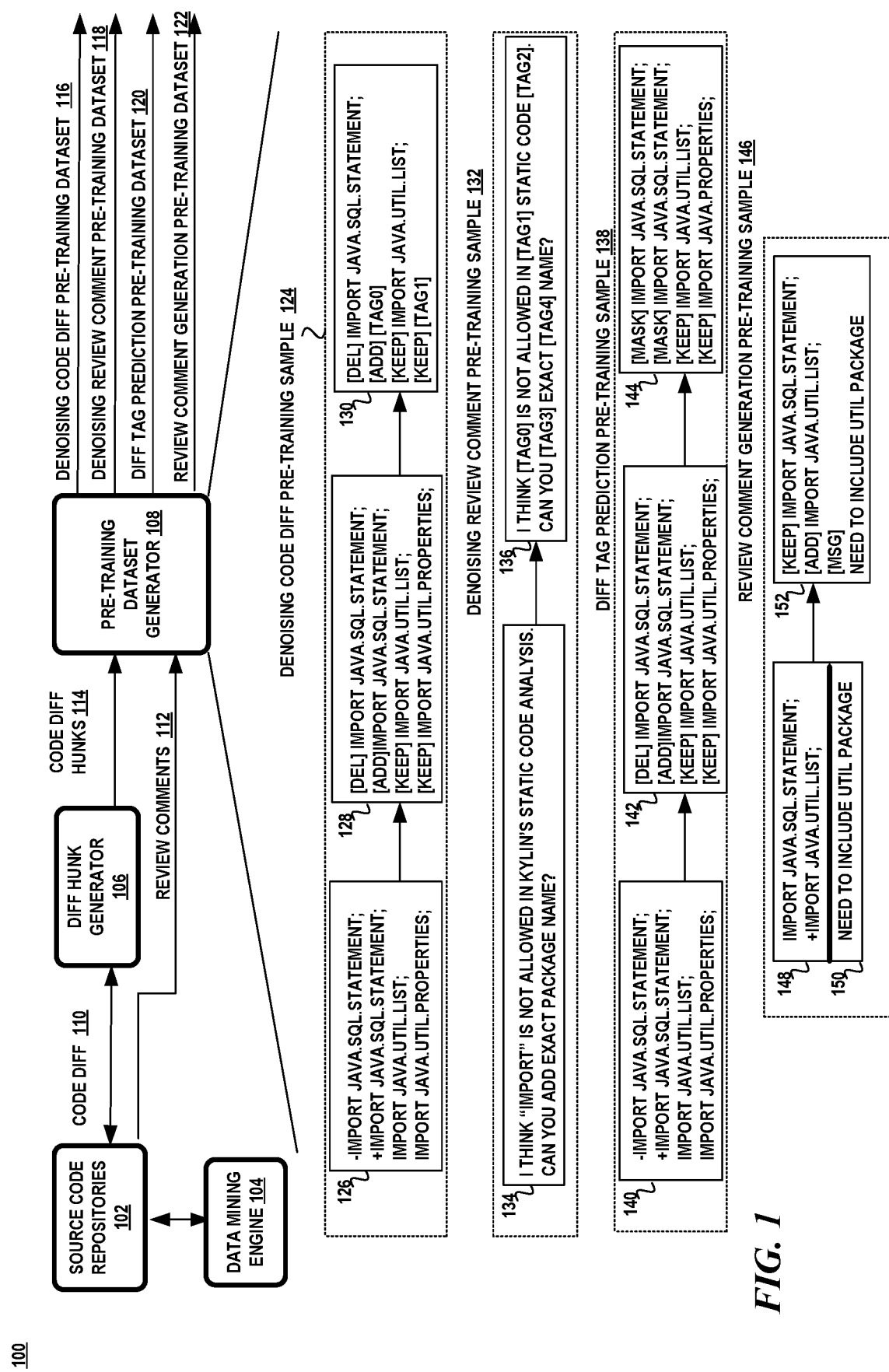
FIG. 1 is a schematic diagram illustrating an exemplary system for the generation of pre-training datasets used to pre-train a deep learning model for code review activities.

Aspects of the present disclosure pertain to the large-scale pre-training of a deep learning model with a variety of unsupervised code review training datasets derived from different code review tasks. The pre-trained deep learning model learns the relationships between code changes and code reviews in order to make predictions for several code review activities, such as, code diff quality estimation, code review generation and code refinement.

Code review is often part of a version-controlled source code repository. A version-controlled source code repository manages changes to the source code files of a file system. Each developer obtains a full copy of the files in the repository in their own branch. The original code is typically stored in a master branch in a separate computing device. The developer makes changes to their version of a file of the repository. The change to the file is noted in a commit. Before a change is merged back into the original source code file, the change is reviewed using the code review process.

The code review process is initiated from issuance of a pull request. A pull request is a request to merge one or more commits into a different branch of the repository, such as the master branch. Peers or reviewers review the code changes and provide comments or suggestions. The developer may make additional changes to the code based on the comments submitted by the peers. The pull request is then approved and the changes are merged into the main branch of the source code repository or discarded.

The pre-training datasets are formed from different code review tasks. The pre-training datasets enable the model to learn the relationships between code changes and their corresponding review comments in order to make predictions for code review activities. The pre-trained model may then be used to perform the automated source code review activity of code review generation. The code review generation task predicts a code review given a code change and its surrounding unchanged context.

The pre-trained model may be fine-tuned for other code review activities, such as code change quality estimation and code refinement. Code change quality estimation predicts whether a code change snippet will be accepted in the code review process. The code change snippet having a high likelihood of being accepted does not need a code review comment. This activity allows the reviewer to select those code changes needing a code review thereby reducing the workload of the reviewer. The code refinement activity predicts the changed code given the original source code and an associated review comment.

The pre-training datasets utilize the code changes formatted in a code diff format. The code diff format shows the changes between two files, such as the original source code and the revised version of the original source code in sequences of lines common to both files, interspersed with groups of differing lines. A code diff hunk is a sequence of changed source code lines, including deleted lines, surrounded by a few unchanged lines or context. The code diff format is an efficient representation of the code changes since the unchanged lines occur only once. The code diff format includes diff characters at the beginning of each line. The diff characters denote changes with "−" and "+" tags and no changes with a blank space. The use of the code diff format to represent the code changes and code review is beneficial since the model is better able to learn code changes. The code diff hunks are a compact and convenient format for showing the code before and the code after the change which includes the editing steps at a given granularity, such as at the line level. As such, the code diff hunk is a more natural way for model learning instead of training the model with raw source code.

Pre-training the deep learning model using pre-training datasets from different code review tasks is advantageous. Deep learning models that are pre-trained on source code do not perform as well as deep learning models that are pre-trained on code review tasks. This is due in part because programming languages are more contracted than natural languages. Through retraining, neural models are able to learn to infer about code syntax and semantics from identifier names. Code review is a complex software engineering task which combines multiple modalities: natural language, source code snippets, and code diffs. By pretraining on the datasets that combine these three modalities, superior results are achieved.

Attention now turns to a more detailed description of the components, methods, processes, and system for creation of a deep learning model for code review tasks.

System

FIG. 1 illustrates a block diagram of an exemplary system 100 for generating the pre-training datasets. The system 100 includes one or more source code repositories 102, a data mining engine 104, a diff hunk generator 106 and a pre-training dataset generator 108.

The data mining engine 104 mines source code repositories 102 for pull requests, commits, comments, and source code files having code changes 110 and/or associated code reviews 112. In an aspect, the code changes and code reviews are mined from publicly-available open-source code repositories 102. The diff hunk generator 106 receives the pull requests, commits, comments and source code files found by the data mining engine 104, extracts the relevant code changes and formats them into a diff-formatted hunk or code diff hunk 114.

The code diff hunk 114 is a sequence of lines having code changes and the surrounding context. The surrounding context includes unchanged lines of code before and after the lines of code changes. At the beginning of each line of changed code, there is a character that identifies the code change. A "!" represents a change between lines that correspond in the two files, a "+" represents the addition of a line, and a "−" indicates the removal of a line. A blank space represents an unchanged line.

The pre-training dataset generator 108 replaces each of the diff characters, (e.g., '+', '−', and blank space) in a code diff hunk with a corresponding special token. The '+' character is replaced with the add token, [ADD], the '−' character is replaced with the delete token, [DEL], and the blank space character is replaced with the [KEEP] token.

The pre-training dataset generator 108 then uses a denoising mask objective to randomly mask tokens in the code diff hunk and in each code review. The model receives the masked sequences of code diff hunks and code reviews and learns to reconstruct the original text by predicting the replacement of the masked tokens.

The pre-training dataset generator 108 generates the pre-training datasets from the code diff hunks and the code reviews. In one or more aspects, the pre-training datasets include any one or more of the following pre-training datasets: denoising code diff pre-training dataset 116; denoising review comment pre-training dataset 118; diff tag prediction pre-training dataset 120; and review comment generation pre-training dataset 122.

The denoising code diff pre-training dataset 116 contains a number of denoising code diff pre-training samples 124. For example, the pre-training dataset generator 108 obtains a code diff hunk containing four lines of source code 126: −Import Java.Sql.Statement; +Import Java.Sql.Statement; Import Java.Util.List; and Import Java.Util.Properties. The pre-training generator 108 replaces the diff characters with the special characters or tokens, [ADD], [DEL], [KEEP]. This transforms the code in box 126 to the following lines of source code 128: [DEL] Import Java.Sql.Statement; [ADD] Import Java.Sql.Statement; [KEEP] Import Java.Util.List; [KEEP] Import Java.Util.Properties. The denoising objective is then applied to the code in box 128 randomly masking out certain lines of source code to generate a pre-training sample 130. The pre-training sample then becomes: [DEL] Import Java.Sql.Statement; [ADD] [TAG0]; [KEEP] Import Java.Util.List; [KEEP] [TAG1] where the tags, [TAG0] and [TAG1], have replaced full lines of source code.

The denoising review comment pre-training dataset 118 contains a number of denoising review comment pre-training samples 132. For example, the pre-training dataset generator 108 receives code review sample 134, "I think "import" is not allowed in Kylin's static code analysis. Can you add exact package name?" The denoising objective is applied to randomly mask out tokens in the code review sample 136. The token Import is replaced with [TAG0], the token Kylin's is replaced with [TAG1], the token Analysis is replaced with [TAG2], the token Add is replaced with [TAG3], and the token Package is replaced with [TAG4]. The code review pre-training sample 136 results in: "I think [TAG0] is not allowed in [TAG1] static code [TAG2]. Can you [TAG3] exact [TAG4] name?".

The diff tag prediction pre-training dataset 120 contains a number of diff tag prediction pre-training samples 138. The pre-training dataset generator 108 receives a code diff hunk 140 and replaces the diff characters in the code diff hunk with the special tokens, [ADD], [DEL], [KEEP] 142. The pre-training dataset generator 108 then randomly masks out certain special tokens 144.

For example, given the following code diff hunk 140: –Import Java.Sql.Statement; +Import Java.Sql.Statement; Import Java.Util.List; and Import Java.Util.Properties, the pre-training generator 108 replaces the diff characters with the special characters, [ADD], [DEL], [KEEP]. This transforms the code to the following lines of source code 142: [DEL] Import Java.Sql.Statement; [ADD] Import Java.Sql.Statement; [KEEP] Import Java.Util.List; [KEEP] Import Java.Util.Properties. The denoising objective then replaces the [DEL] and [ADD] tag with the [MASK] token resulting in the following diff tag prediction pre-training sample: [MASK] Import Java.Sql.Statement; [MASK] Import Java.Sql.Statement; [KEEP] Import Java.Util.List; [KEEP] Import Java.Util.Properties.

The review comment generation pre-training dataset 122 contains a number of review comment generation pre-training samples 146. The pre-training dataset generator 108 receives a code diff hunk representation of a code change 148 and its corresponding code review 150. The pre-training dataset generator 108 replaces the diff characters in the code diff hunk 148 with the special tokens and appends the natural language of the code review with the [MSG] token in between the source code and the code review. The [MSG] token represents the separation of code change snippet and natural language text of the corresponding code review.

Figure 2:
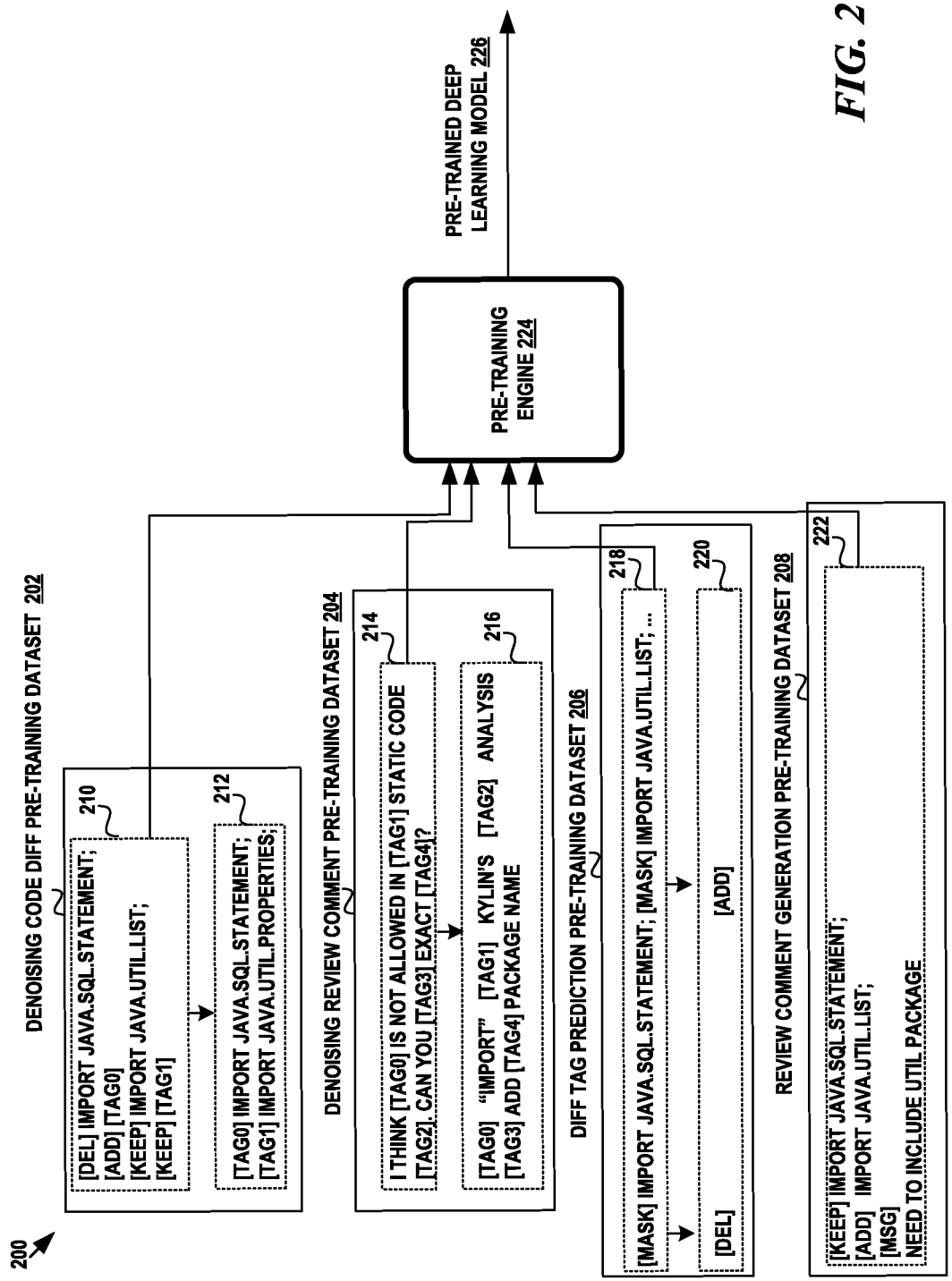
FIG. 2 is a schematic diagram illustrating an exemplary system for pre-training a deep learning model for code review activities.

Turning to FIG. 2, there is shown a more detailed depiction of the pre-training of the deep learning model 200. There is shown the denoising code diff pre-training dataset 202, the denoising review comment pre-training dataset 204, the diff tag prediction pre-training dataset 206, and the review comment generation pre-training dataset 208 input into the pre-training engine 224.

The denoising code diff pre-training dataset 202 consists of pre-training samples of code changes based on a diff format with spans of code lines masked 210. The deep learning model is trained to learn to predict the tokens to replace the masked lines of code. As shown in box 210, there are two lines of code that are replaced with masked tokens, [TAG0], [TAG1]. The model is trained to learn to predict the source code lines to replace these masked tokens. As shown in box 212, the source code line Import Java.Sql.Statement replaces the mask token [TAG0] and the source code line Import Java.Sql.Util.Properties replaces the mask token [TAG1].

The denoising review comment pre-training dataset 204 consists of training samples of code review comments having masked tokens, [TAG0], [TAG1], [TAG2], [TAG3], [TAG4] 214. The deep learning model is trained to learn to predict the tokens to replace the masked tokens. As shown in box 216, the token Import replaces the token [TAG0], the token Kylin's replaces the [TAG1] token, the token Analysis replaces the token [TAG2], the token Add replaces the [TAG3] token, and the token Package Name replaces the token [TAG4].

The diff tag prediction pre-training dataset 206 consists of diff tag prediction pre-training samples of code changes having masked special tokens. The deep learning model is trained to learn to predict the special token to replace the masked special token in a particular position. As shown in box 218, there is shown a code change in a diff-format with masked tokens, [MASK], which the model is trained to replace with a respective special token, [DEL], [ADD], for each respective position 220.

The pre-training engine 224 receives each pre-training sample of each pre-training dataset and transforms each pre-training sample into an input embedding sequence that is input into the deep learning model. There is no particular order in which the pre-training datasets are input to train the deep learning model. Upon completion of the pre-training, the pre-training engine may test and validate the deep learning model to meet specific performance targets.

In an aspect, the pre-trained deep learning model 224 may be fine-tuned for a particular code review task. Fine-tuning is an additional training step that occurs after the pre-training tasks. Fine-tuning differs from pre-training since it uses supervised training data. Supervised training data includes labeled data that instructs the model to learn the output related to each input. The model is trained to detect the underlying patterns and relationships between the input data and the output labels, enabling it to yield accurate labeling results when presented with never-before-seen data.

Figures 3A, 3B, 3C:
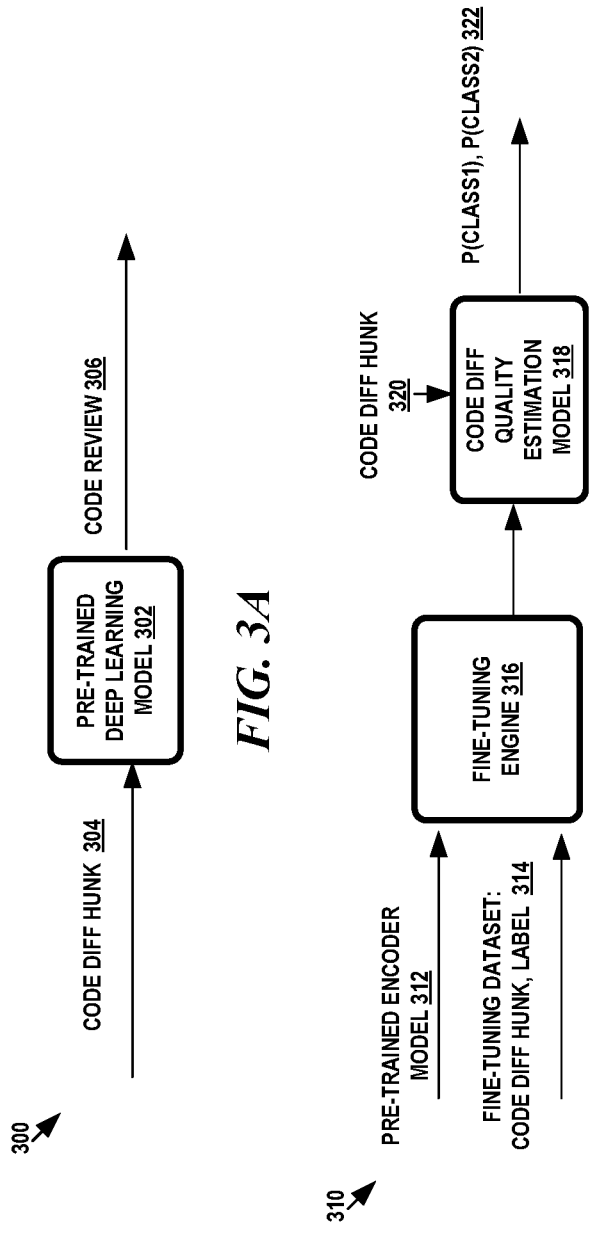
FIG. 3A is a schematic diagram illustrating usage of the pre-trained deep learning model for code review generation.
FIG. 3B is a schematic diagram illustrating fine-tuning of the pre-trained deep learning model for code diff quality classification.
FIG. 3C is a schematic diagram illustrating fine-tuning of the pre-trained deep learning model for source code refinement.

Turning to FIG. 3A, there is shown an exemplary application 300 of the pre-trained deep learning model 302 to generate a code review 306 given a code diff hunk 304. In this aspect, the pre-trained deep learning model 302 does not require any fine-tuning to generate a code review.

Turning to FIG. 3B, there is shown an exemplary pre-trained deep learning model trained to classify whether a code changes snippet needs a code review comment. The encoder portion of the pre-trained deep learning model 312 is fine-tuned for the code quality estimation classification. A fine-tuning engine 316 trains the encoder portion of the pre-trained deep learning model 312 with a fine-tuning dataset 314 resulting in a code quality estimation model 318. The fine-tuning dataset 314 includes samples consisting of a code diff hunk. The label indicates whether the code diff hunk requires a code review or not. The code quality estimation model 318 is then used to compute a probability for each class, Class1, Class2 given a code diff hunk, where Class1 represents the class requiring a code review and Class2 represents the class not needing a code review.

Turning to FIG. 3C, there is shown the pre-trained deep learning model 328 trained to learn to generate refined source code 338. A fine-tuning engine 332 trains the pre-trained deep learning model 328 with a fine-tuning dataset 330 having the triplets, $C_1, R_{NL}, C_2$, where $C_1$ is the revised source code having the code review $R_{NL}$ and $C_2$ is the version of the source code modified in accordance with the code review $R_{NL}$. The result of the fine-tuning is a code refinement model 334 that is able to predict the refined source code 338 given the original source code and its related code review 336. The refined source code incorporates the suggestions noted in the related code review.

Attention now turns to a more detailed description of the deep learning model.

Neural Transformer Model

In an aspect, the deep learning model is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model and neural transformer model with attention are used interchangeably. It should also be noted that the aspects disclosed herein are described with respect to neural transformer model with attention. However, the techniques are not limited to these types of neural networks and can be applied to other types of deep learning models that utilize a neural network with an attention mechanism, such as a memory efficient transformer (e.g., Poolingformer), or an encoder-decoder transformer with multi-head cross-attention.

Figure 4:
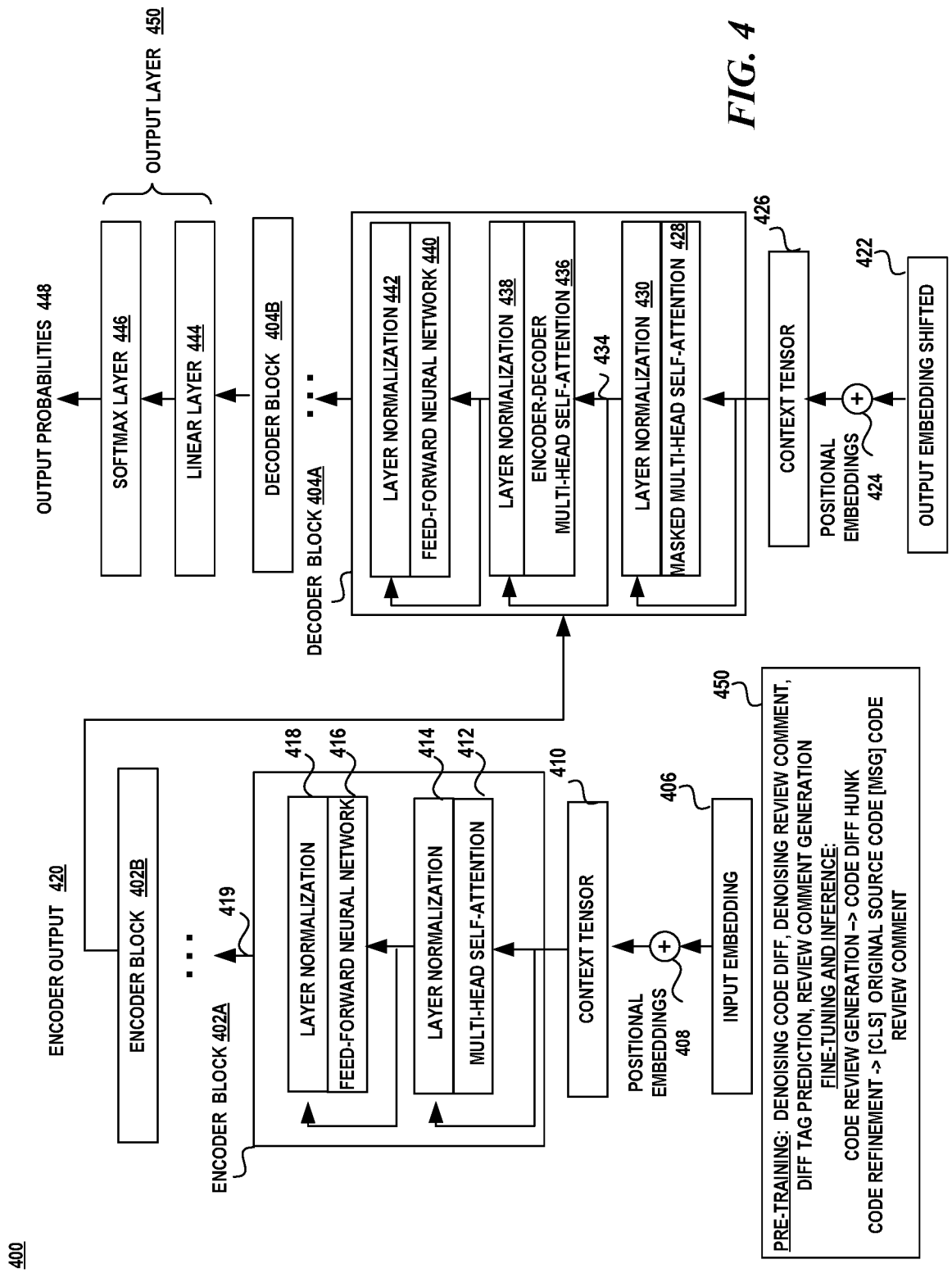
FIG. 4 is a schematic diagram illustrating an exemplary architecture of a deep learning model as a neural transformer model with attention.

FIG. 4 shows an exemplary structure of the neural transformer model with attention in an encoder-decoder configuration. The neural transformer model 400 contains one or more encoder blocks 402A, 402B coupled to one or more decoder blocks 404A, 404B. The initial inputs to an encoder block 402 are the input embeddings 406 of an input sequence of a pre-training dataset, fine-tuning dataset, or inference data. In order to retain the order of the tokens in the input embedding 406, positional embeddings 408 are added to the input embedding 406 forming a context tensor 410. The initial inputs to the first decoder block 404A are a shifted sequence of the output embeddings 422 from a previous time step to which the positional embeddings 424 are added forming context tensor 426.

An encoder block 402A, 402B consists of two layers. The first layer includes a multi-head self-attention component 412 followed by layer normalization component 414. The second layer includes a feed-forward neural network 416 followed by a layer normalization component 418. The context tensor 410 is input into the multi-head self-attention component 412 of the first encoder block 402A with a residual connection to the layer normalization component 414. The output of the layer normalization component 414 is input to the feed-forward neural network 416 with another residual connection to layer normalization component 418. The output of the encoder block 402 is a set of hidden representations 419. The set of hidden representations 419 is then sent through additional encoder blocks. At the last encoder block, the set of hidden representations 420 is sent to the decoder 404.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head self-attention component 412 takes a context tensor 410 and weighs the relevance of each token represented in the context tensor 410 to each other by generating attention weights for each token in the input embedding 406. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q, K, V) = \text{Concat}(\text{head}_1, \ldots, \text{head}_h)W^O,$$

where $\text{head}_i = \text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization components 414, 418 normalize the inputs across the features. The mean and standard deviation is computed across the feature dimensions.

The feed-forward neural network 416 processes each output encoding separately. The output of the top encoder block is a set of attention vectors K and V 420 which is used by the encoder-decoder multi-head self-attention layer 436 of the decoder block 404.

The decoder block 404A, 404B predicts each token t, in the target programming language one-by-one at each time step conditioned on all previously-generated target tokens $t_1, \ldots, t_{i-1}$. A decoder block 404A, 404B consists of three layers. The first layer includes a masked multi-head self-attention component 428 followed by a layer normalization component 430. The output of the layer normalization component is input into the encoder-decoder multi-head attention component 436 with a residual connection to layer normalization component 438. The second layer includes an encoder-decoder multi-head self-attention component 436 followed by a layer normalization component 438. The third layer includes a feed-forward neural network 440 followed by a layer normalization component 442. The output of layer normalization component 442 is input into the feed-forward neural network 440 with a residual connection to layer normalization component 442.

The masked multi-head self-attention component 428 receives the output embeddings of the previous timestep. The masked multi-head self-attention component 428 masks the output embeddings from future time steps. The encoder-decoder multi-head self-attention layer 428 receives queries from the previous decoder layer and the memory keys and values 420 from the output of the last encoder block 402. In this manner, the decoder block 404 can attend to every position of the input sequence. The feed-forward neural network 440 processes each output encoding separately. A layer normalization component 430, 438, 442 is used between the layers in order to normalizes the inputs across the features.

In one aspect, the neural transformer model contains a stack of twelve encoder blocks and a stack of twelve decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Figure 5:
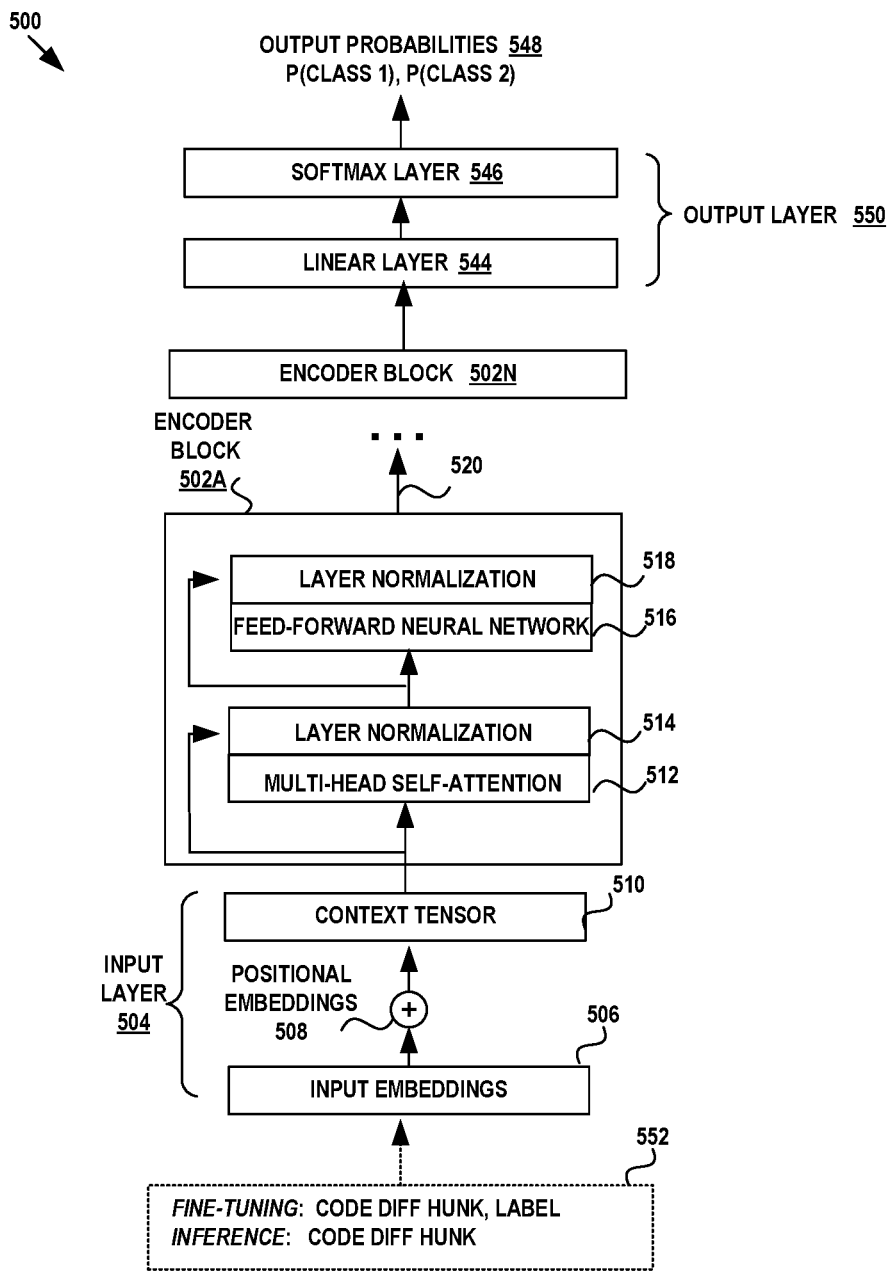
FIG. 5 is a schematic diagram illustrating an exemplary architecture of a neural encoder transformer model with attention.

Turning to FIG. 5, there is shown a configuration 500 of the encoder portion of the pre-trained deep learning model. The structure of the encoder shown in FIG. 5 is similar to the structure of the encoder in the pre-trained deep learning model shown in FIG. 4 except for the output layer 550. The encoder 500 includes one or more encoder blocks 502A, 502N where each encoder block contains two layers. The first layer includes a multi-head self-attention component 512 and a layer normalization component 514 and the second layer includes a feed-forward neural network 516 and a layer normalization component 518. The input layer 504 includes an input embedding 506 combined with its positional embeddings 508 to form a context tensor 510.

The structure of the encoder 500 differs from the configuration shown in FIG. 4 since the output of the last encoder block 502N goes into an output layer 550 that includes a linear layer \and a softmax layer 546. The linear layer is a neural network that receives the unscaled output of the last encoder block and turns them into logits. A logit is an unnormalized prediction of the feed-forward output from the last encoder block.

The softmax layer 546 applies the softmax function to the logits of the linear layer to approximate a probability distribution having two classes, Class 1 and Class 2 548. Class 1 represents a code diff needing a code review and Class 2 represents a code diff that does not need a code review. The output probabilities, P(Class 1), P(Class 2) indicate the likelihood that the given code diff and context needs a code review or not.

The encoder 500 is pre-trained with the four pre-training datasets to learn the parameters that meet the cost function. These parameters are then fine-tuned for the classification task 552 given a supervised dataset of pairs of a code diff hunk and a label. The encoder 500 is then used for the code quality estimation classification given a code diff hunk 552. Methods Attention now turns to a more detailed description of the methods used in the system for automating code review activities. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Pre-training is the process where the model's parameters (e.g., embeddings, weights, biases) are learned from unsupervised data. The model learns the parameters through the optimization of the cost function used by the neural network layer of the model. The cost function determines the error loss from the previous epoch which is then backpropagated to the preceding layers of the model. The model's parameters are updated through backpropagation based on the error loss determined by the cost function.

Fine-tuning is the process where the model's parameters generated by the pre-training are updated from supervised data. The optimization of the cost function used in the neural network layer of the model determines the error loss from the previous epoch which is then backpropagated to the preceding layers of the model. The model's parameters are updated through backpropagation based on the error loss determined by the cost function. Once the model is fully trained, the model's embeddings are stored in a separate data structure and used in the inference process to transform an input sequence of tokens into a sequence of input embeddings. Each token in an input sequence is converted into its corresponding embedding resulting in the sequence of input embeddings that is applied to the model.

Figure 6:
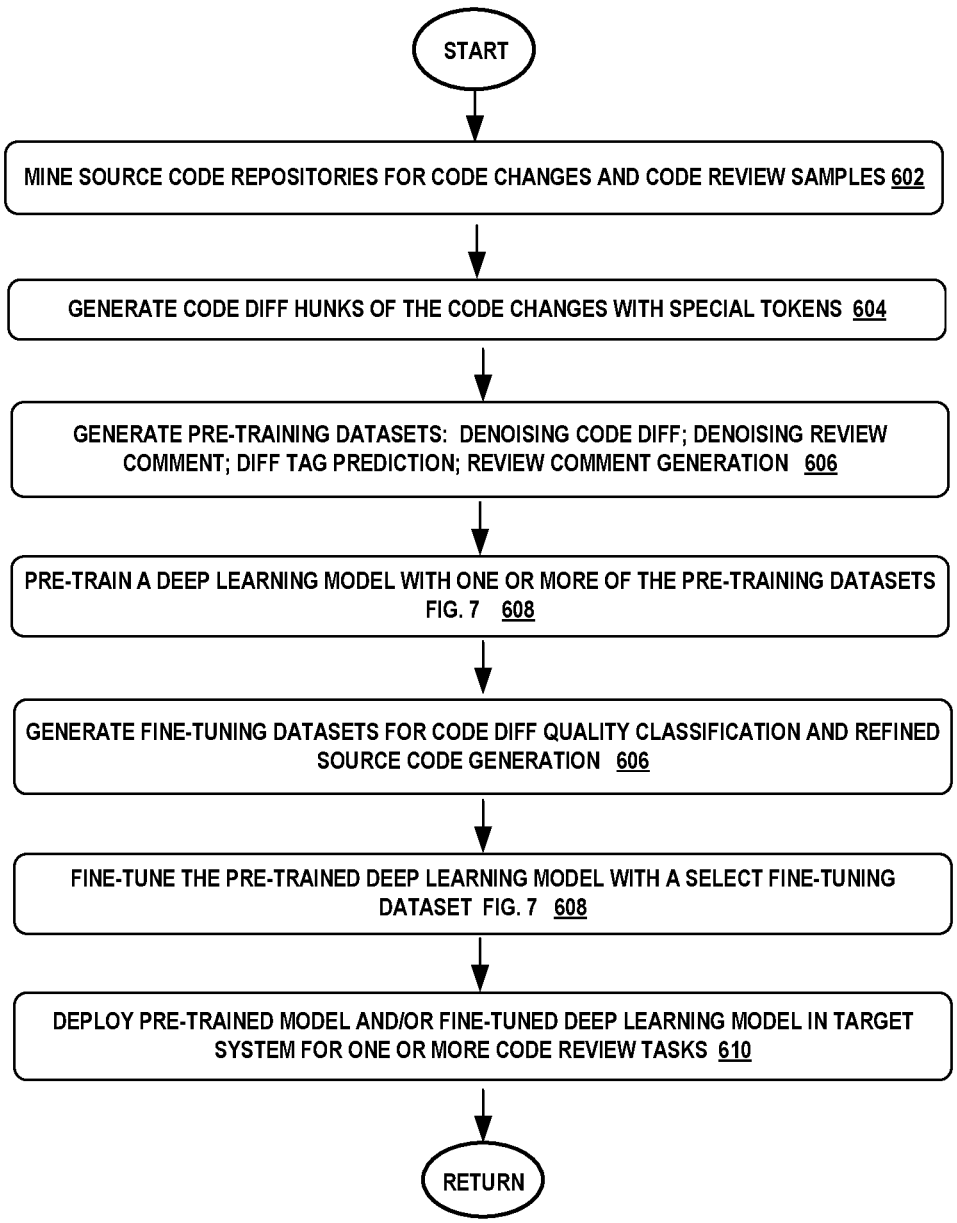
FIG. 6 is a flow diagram illustrating an exemplary method for pre-training a deep learning model to automate a variety of code review activities.

Turning to FIGS. 1 and 6, there is shown an exemplary method for pre-training a deep learning model for use in automating code review activities 600.

The data mining engine 104 mines various source code repositories 102 for pull requests, commits, comments, code reviews, source code, and data that is used to generate the pre-training datasets. The data mining engine 104 extracts a code change snippet from the differences between two versions of a source code file found in commits of a pull request. The code change snippet may include a code review which includes comments describing the reasons for the change, suggestions for remedies, and so forth. (Collectively, block 602).

In an aspect, the GitHub Representational State Transfer ("REST") Application Programming Interface ("API") is used to collect pull requests from projects of a source code repository. The GitHub REST API allows access to branches, commits, pull request, code diff, review comments and the like. An Exploit Those Code Reviews ("ETCR") tool is used to collect metadata of pull requests and review comments that is used to query, via the GitHub API, code changes, including the original file, new file, and code diff, corresponding to the review comments. The code changes and review comments are collected to build the pre-training datasets. (Collectively, block 602).

A code diff shows the changes between two versions of the same source code file in the diff format. The code diff is extracted from a pull request. Alternatively, the code diff may be generated from software tools such as the diff utility of the Unix operating system and other such tools. From the code diff, a code diff hunk is produced which contains the code diff and a number of source code lines surrounding the code diff that have not been changed. The diff hunk generator 106 replaces the diff characters in the diff hunk (e.g., "+", "−", " ") with a corresponding special token (e.g., [DEL], [ADD], [KEEP]). (Collectively, block 604).

The pre-training dataset generator 108 then performs masked denoising on certain features of a pre-training dataset. The masked denoising is based on the doze task of evaluating human language-learners' proficiency, in which humans are given a foreign language with missing words, and are asked to correctly choose the missing word. The benefit of the mask denoising in pre-training is that the model learns the desired language in an unsupervised fashion, but also is bi-directional in the sense that it learns the relationships of words both before and after their occurrence. (Collectively, block 606).

For the diff tag prediction pre-training dataset, the pre-training dataset generator 108 receives a code diff hunk and randomly masks certain tags (e.g., [DEL], [ADD], [KEEP]) with a mask tag, [MASK]. For the denoising code diff pre-training dataset, the pre-training dataset generator 108 receives a diff hunk and randomly masks out lines of source code which are replaced with a respective tag (e.g., [TAG0]). For the denoising code review pre-training dataset, the pre-training dataset generator 108 receives a code review and randomly masks out different tokens within the review with a respective tag (e.g., [TAG1]). For the review comment generation pre-training dataset, the pre-training dataset generator 108 receives the code diff hunk and code review separated by the [MSG] token. The [MSG] token indicates the natural language text of the code review. (Collectively, block 606).

Figure 7:
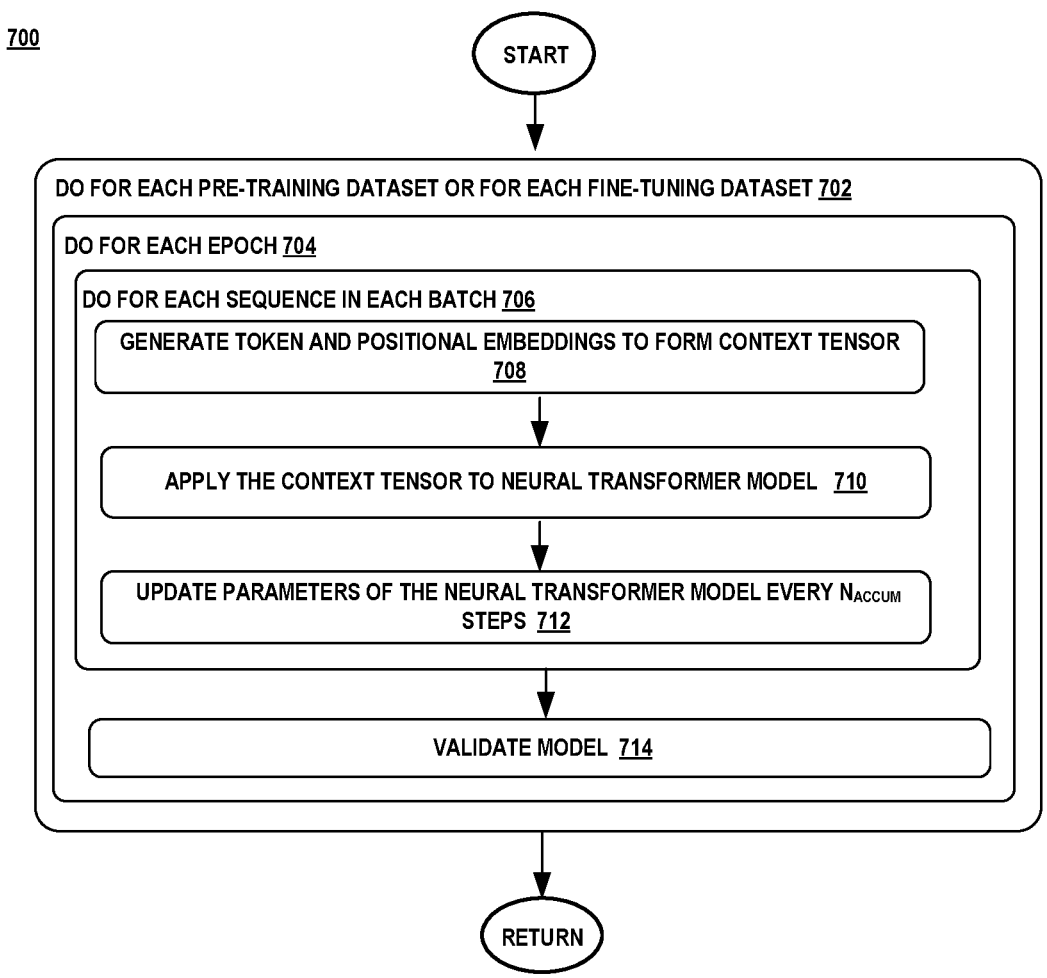
FIG. 7 is a flow diagram illustrating an exemplary method of pre-training and fine-tuning the deep learning model with the different training datasets.

Upon completion of the generation of the pre-training datasets, the neural transformer model with attention is trained with each of the pre-training datasets (block 608). Turning to FIGS. 4 and 7, there is shown an exemplary method 700 for training a neural transformer model with attention with the pre-training datasets.

Each of the pre-training samples of a pre-training dataset is an input sequence that is transformed into a sequence of input embeddings. The input sequence is tokenized and each token in replaced with a respective embedding transforming the input sequence into a sequence of input embeddings. An embedding is a learned representation for the text-based tokens where tokens that have a common meaning have a common representation. An embedding is a mapping of discrete categorical variables to a vector of continuous numbers. There is an embedding for each token of the source code and natural language text of the code reviews used in the pre-training and fine-tuning datasets. Each token embedding has a corresponding positional embedding. The neural transformer model does not read each token sequentially and as such, has no knowledge of the token's position in a sequence without additional position information. The positional embedding is used to encode position information about a token's position in a sequence into the neural transformer model.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations.

Each training iteration includes forward propagation, loss calculation, backpropagation steps followed by updating the weights. The training dataset is partitioned into batches with each batch of sequences running through the pre-training process.

The neural transformer model has multiple blocks and layers so that more detailed relationships within the data is learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

For each input sequence of each batch in each epoch (blocks 702, 704), the T-ordered sequences of tokens are then mapped into numeric vectors and then into respective token embeddings and positional embeddings (block 706).

Initial values are generated for the token embedding and positional embeddings of each input sequence which are then used to form a context tensor. Thereafter, the neural transformer model learns the values for each embedding through backpropagation. Upon the completion of the training phase, the embeddings for each token and the positional embeddings are saved into respective matrices for later use. There is a token embedding matrix, We, that contains an embedding vector for each token $t_i$, $i=0 \ldots V$ of a particular programming language, and a positional embedding matrix, $W_p$, that contains an embedding vector $P_j$, $j=0 \ldots T$, for each position, where V is the size of the vocabulary for a particular programming language and T is the length of the token sequence. (Collectively, block 708).

The first encoder block 402A of the neural transformer model 400 takes the context tensor 410 as input and passes it through the multiple layers of multi-head self-attention, layer normalization and feed-forward neural network to finally produce a set of hidden representations If there are additional encoder blocks, the output of each encoder block is passed onto the next encoder block with the output of the last encoder block producing the set of hidden representations 420. The set of hidden representations is passed onto each decoder block 404A, 404B. (Collectively, block 710).

The output layer 450 generates output probabilities 448 of each token in the model vocabulary which is used to predict the tokens to replace the masked tokens. The model's vocabulary consists of tokens from the source code programs and natural language text of the code reviews used to train the model. (Collectively, block 710).

The first decoder block 404A of the pre-trained neural transformer model takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T Starting with the first token of the output sequence, the tokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 710).

The feed forward neural networks in the encoder blocks 402A, 402B and the decoder blocks 404A, 404B are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 710).

At the completion of each batch, the parameters of the neural transformer model are updated at a preconfigured frequency denoted as Naccum. Naccum is a gradient accumulation frequency and in one aspect has a value of 8. The parameters include the token embeddings and the positional embeddings which are stored in a respective embedding matrix. (Collectively, block 712).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 714).

Turning back to FIG. 6, the pre-trained deep learning model may be fine-tuned for a particular code review activity, such as code quality estimation classification or refined source code generation. For each particular code review activity requiring fine-tuning, a particular fine-tuning dataset is generated for the code review activity. (Collectively, block 606)

For the code quality estimation classification activity, the source code repositories are mined for code changes. All changed code having a code review is regarded as suspicious code that introduced software bugs or conflicts with code specifications and labeled as requiring a code review. Other changed code without a code review or comments are labeled as correct and not requiring a code review. (Collectively, block 606).

For the code refinement task, the fine-tuning dataset consists of the triplets, ($C_1$, $R_{NL}$, $C_2$), where $C_1$ represents the changed code, $C_2$ represents a newer version of the changed code from a later commit, and $R_{NL}$, represents the code review comments of the $C_1$ version of the changed code. (Collectively, block 606).

To generate the code quality estimation classifier model, the encoder portion of the pre-trained neural transformer model is used and trained using the fine-tuning dataset for the code quality estimation classification. (Collectively, block 608).

For the code refinement activity, the pre-trained neural transformer model is trained using the fine-tuning dataset for the code refinement activity. The fine-tuning process encompasses the same steps shown in FIG. 7 which were described above with the following exceptions. The fine-tuning process starts out with the parameters generated from the pre-training which are updated based on the model calculations made from the fine-tuning dataset. The fine-tuning dataset is used instead of the pre-training dataset. (Collectively, block 608).

Upon completion of all the training processes, the pre-trained model and/or the fine-tuned models are deployed in a target system. In one aspect, the models may be deployed as part of a version-controlled source code repository. The version-controlled source code repository may utilize the models to determine whether code review is necessary for a particular commit by using the code quality estimation model, to automatically generate a code review using the code review generation model and/or to automatically produce modified source code given a code review and the corresponding original source code. (Collectively, block 610).

Figure 8:
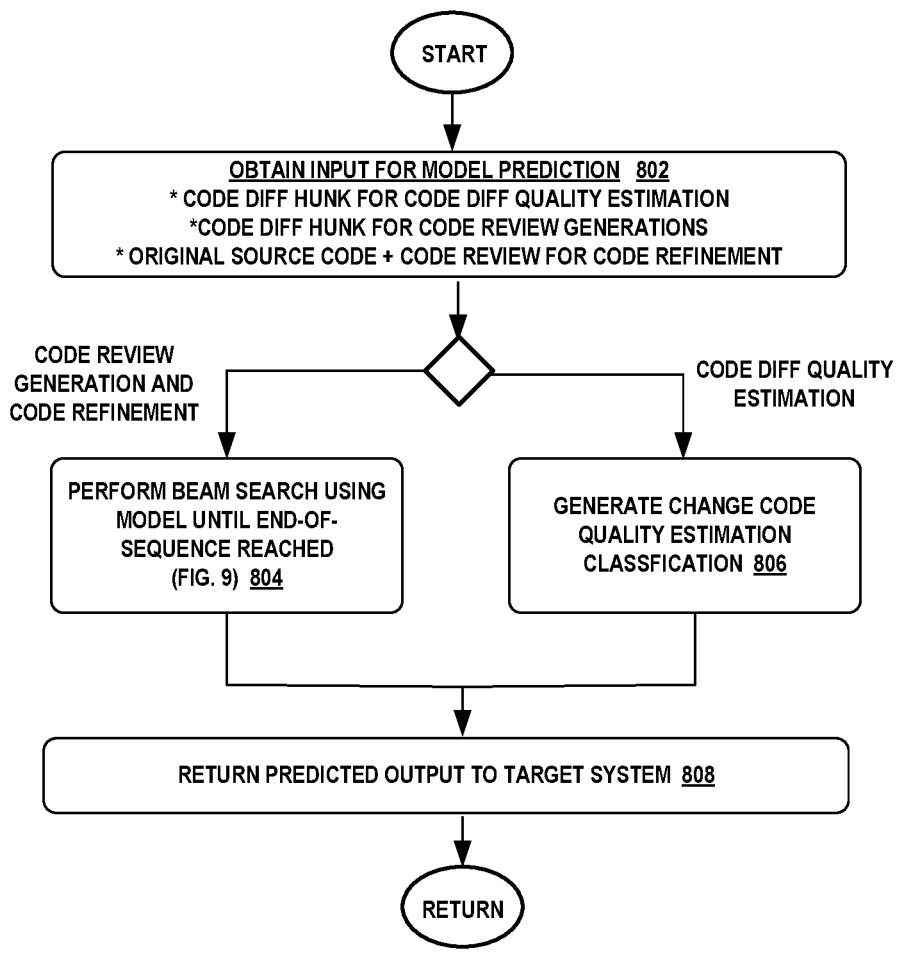
FIG. 8 is a flow diagram illustrating an exemplary method of the operation of the deep learning model to make predictions for a code review activity.

Attention now turns to the operation of the trained models. Turning to FIG. 8, there is shown an exemplary process 800 for automating code review activities.

An automatic code review system receives an input for one of the automated code review activities. For the code quality estimation classification and code review generation, the input is the code diff hunk of a changed code. For code review generation, the input is the code diff and context of a changed code. For code refinement generation, the input is the original source code and the corresponding code review. (Collectively, block 802).

For the code review generation and the code refinement generation, a beam search is employed to search for candidate code reviews or refined source code snippets (block 804). For the code quality estimation classification, the code quality estimation classifier is used to produce the probabilities of Class1 and Class2 (block 806). The output from each automated activity is then output to the target system (block 808).

Figure 9:
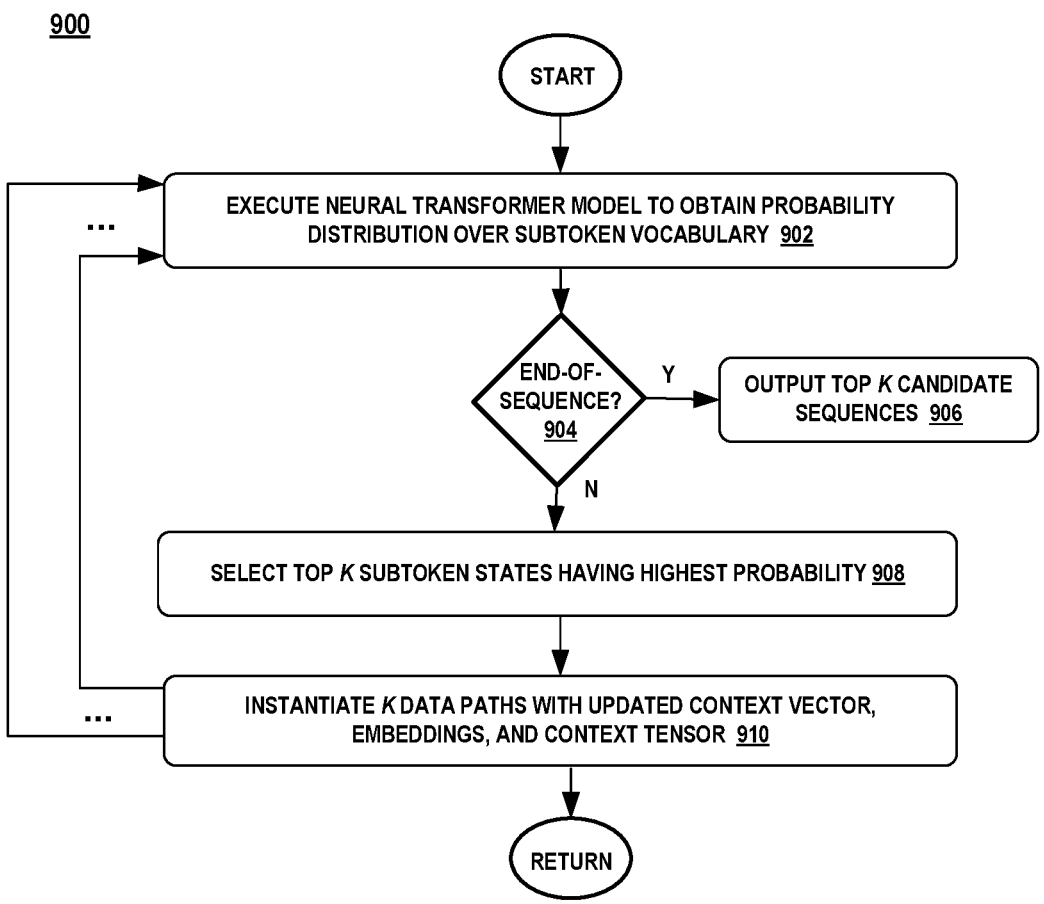
FIG. 9 is a flow diagram illustrating an exemplary method of a beam search using the deep learning model to generate code a code review or refined source code.

Attention now turns to a more detailed discussion of the generation of the code review and refined code. FIG. 9 illustrates an exemplary method 900 of a beam search for generating code review candidates and refined source code snippet candidates.

The inference phase of the automated code review system is the process that generates the code review candidates and the refined code candidates using the trained models. The inference phase uses a beam search to search for these candidates. This is because the decoder of the neural transformer model generates each token one at a time. The neural transformer model factorizes the probability of the target tokens in an input sequence into a product of conditional probabilities for each token using the formula: $p(t_1, \ldots t_m|s) = \Pi_{i=1}^{m} p(t_i|t_1, \ldots, t_{i-1}, s)$, where $t_i$ represents the token at timestep i, and s represents the input sequence. During inference, the calculation of $\arg\max_t p(t|s)$ is complex and extremely time consuming making the model difficult for real-time applications. Beam search is an approximation algorithm that performs faster.

The beam search uses the probability distribution generated by the neural transformer model to identify the top k tokens likely to be the next token in a candidate code review or code refinement sequence. The beam search expands the search by instantiating new partial sequences using each of the selected tokens identified by the neural transformer model's probability distribution. The search continues generating new partial sequences from the top k tokens identified by the output distributions from the neural transformer model until the search ends. The search may end when the end-of-sequence appears as the most probable next token.

The beam search uses a breadth-first search to build a search tree. The search tree is composed of nodes at one or more inference levels. Each node represents a probability distribution generated by the neural transformer model for the tokens in the model vocabulary. At each level, only the top k tokens having the highest probabilities from the output distribution generated by the neural transformer model are expanded to the next inference level. The variable k is preconfigured and referred to as the beam width. Each of the k tokens is then expanded into a search that updates the current context sequence with the selected token to input into the neural transformer model to generate an additional probability distribution for the next token in a sequence. This process is repeated until the end-of-sequence token is predicted as being the next likely token candidate.

Turning to FIG. 9, there is shown an exemplary beam search for generating code review candidates and refined code candidates. The beam search 900 uses a context vector to initiate an inference process using the probability distribution generated from the neural transformer model, $P_0 \ldots P_{|V|}$ (block 902). If the probability distribution indicates that an end-of-sequence token is the most likely token to follow in a partial candidate sequence (block 904—yes), then the top k candidate sequences are output to the target system (block 906). Otherwise, the beam search 900 takes the top k states or tokens identified from the probability distribution generated by the neural transformer model in the inference process (block 908). A new context vector is generated for each of the k states, $c_1, \ldots c_k$, using the new token in the context vector. The new context vectors are then input into the inference process (blocks 902-910). The beam search 900 ends when the end-of-sequence token is selected as the most likely candidate to complete a partial candidate sequence.

FIGS. 11A-11C depict experimental results for each of the code review activities compared with the Transformer, T5, and CodeT5 models. The model described above is referred to as the CodeReviewer model. The Transformer model is not pre-trained, whereas the T5 and CodeT5 models are pre-trained but on different pre-training datasets than the CodeReviewer model. Each of the models is fine-tuned with the same fine-tuning dataset for each code review activity in order for there to be a fair comparison of the results from each model.

The Transformer model is the neural transformer model with attention discussed in Vaswani, et al., "Attention Is All You Need", published Dec. 6, 2017, at https://arxiv.org/abs/1706.03762. The Transformer model is a neural transformer model with attention having twelve encoder blocks and/or twelve decoder blocks. The Transformer model is not pre-trained. Instead, the Transformer model is fine-tuned or continuously trained on the fine-tuning dataset for a particular code review activity.

The T5 model is a pre-trained Text-to-Text transformer model discussed in Tufano et al., "Using Pre-Trained Models to Boost Code Review Automation", published Jan. 18, 2022, at https://arxiv.org/abs/2201.06850. The T5 model is a neural transformer model with attention having six encoder blocks coupled to six decoder blocks. The T5 model is pre-trained to learn English language text and the programming language of a downstream task.

CodeT5 is a pre-trained neural transformer model with attention that is described in Wang, et al., "Code T5: Identifier-aware Unified Pre-trained Encoder-Decoder Models for Code Understanding and Generation", published on Sep. 2, 2021 at https://arxiv.org/abs/2109.00859. CodeT5 is a pre-trained neural transformer model with attention configured with twelve encoder blocks and twelve decoder blocks. The model is pre-trained with source code and/or source code and English natural language text. The English natural language text represents code comments or documentation.

FIG. 11A is a depiction of experimental results showing the improvement of the pre-training on a change code quality estimation activity 1100. The encoder portion of each of the models is trained on a fine-tuning dataset consisting of a code diff hunk and a label. The label indicates whether or not the code diff hunk needs a code review.

Code change quality estimation activity is a binary classification task where precision, recall, F1, and accuracy are the performance measures. Precision refers to the number of true positives over the sum of the number of true positives and the number of false positives. Recall refers to the number of true positives over the sum of the number of true positives and the number of false negatives. The F1 score is the combination of the precision and recall score, otherwise the harmonic mean of the precision and recall scores. Accuracy is a metric for classification models that measures the number of predictions that are correct as a percentage of the total number of predictions that are made.

As shown in FIG. 11A, the CodeReviewer model outperforms the Transformer, T5, and CodeT5 models on all four metrics. The CodeReviewer model improves F1 and accuracy by 8.24% and 7.07% compared with T5. The improvement over CodeT5 is over about 7% which demonstrates that the CodeReviewer understands code changes better. The performance of Transformer, which does not utilize pre-training, is inferior to the other three models thereby showing the importance of pre-training. The performance results shown in FIG. 11A illustrate that pre-training on code review activities and in the code diff format outperforms other pre-trained models and models that are not pre-trained.

FIG. 11B is a depiction of experimental results showing the improvement of the pre-training on code review comment generation 1102. The code review comment generation task generates a code review in natural language text give a code diff hunk. Each of the models was fine-tuned or continuously trained on a code diff hunk and related code review.

The experimental results are shown with respect to the four models: Transformer; T5; CodeT5; and CodeReviewer. The metrics include the BiLingual Evaluation Understudy (BLEU) metric and the human evaluation set of Information and Relevance. The BLEU score measures the similarity of machine-generated code reviews to a set of high-quality code review references. A value of 0 means that the machine-generated output has no overlap with a code review reference (low quality) while a value of 1 means there is perfect overlap with the reference (high quality).

A human evaluation of the predicted code review comments was performed since the code review generation task is a more difficult task to evaluate due to the diverse and non-uniqueness of the comments. Professional programmers were utilized to review the model-generated code reviews and reference code reviews. The information score is based on the content of the code review and the relevance score is based on how relevant the code review is to the changed code.

As shown in FIG. 11B, the code review comments generated by CodeReviewer are more informative and relevant compared with the other models. The performance of the T5 model is inferior to the other models which may be based on its parameter size which was about one-fourth the size of the other models thereby indicating that the code review generation task is too challenging for smaller-sized models. The results in FIG. 11B show the importance of pre-training on code review tasks and the code diff format which achieves a technical improvement to the automation of code reviews.

FIG. 11C is a depiction of experimental results showing the improvement of the pre-training on a code refinement activity 1104. The code refinement activity generates a refined source code snippet having been changed in accordance with a code review. Each of the models was fine-tuned on a fine-tuning dataset consisting of original source code and its corresponding code review.

The results include a BLEU score and an ExactMatch ("EM") metric. The EM metric measures the percentage of predictions that match any one of the ground truth answers exactly. The baseline models include NativeCopy, T5, and CodeT5. NativeCopy directly copies the input code as the code refinement result generating a BLEU score but an EM score of 0.00. Code Reviewer generates the repaired code exactly the same as the ground truth code for more than 30% of the cases which is two times more than the result of T5 and 25% more than CodeT5 demonstrating the improvement of pre-training on code review tasks with code diffs. Transformer is not shown in FIG. 11C since the model failed to converge in 10 epochs producing a 0 BLEU score.

Exemplary Operating Environment

Figure 10:
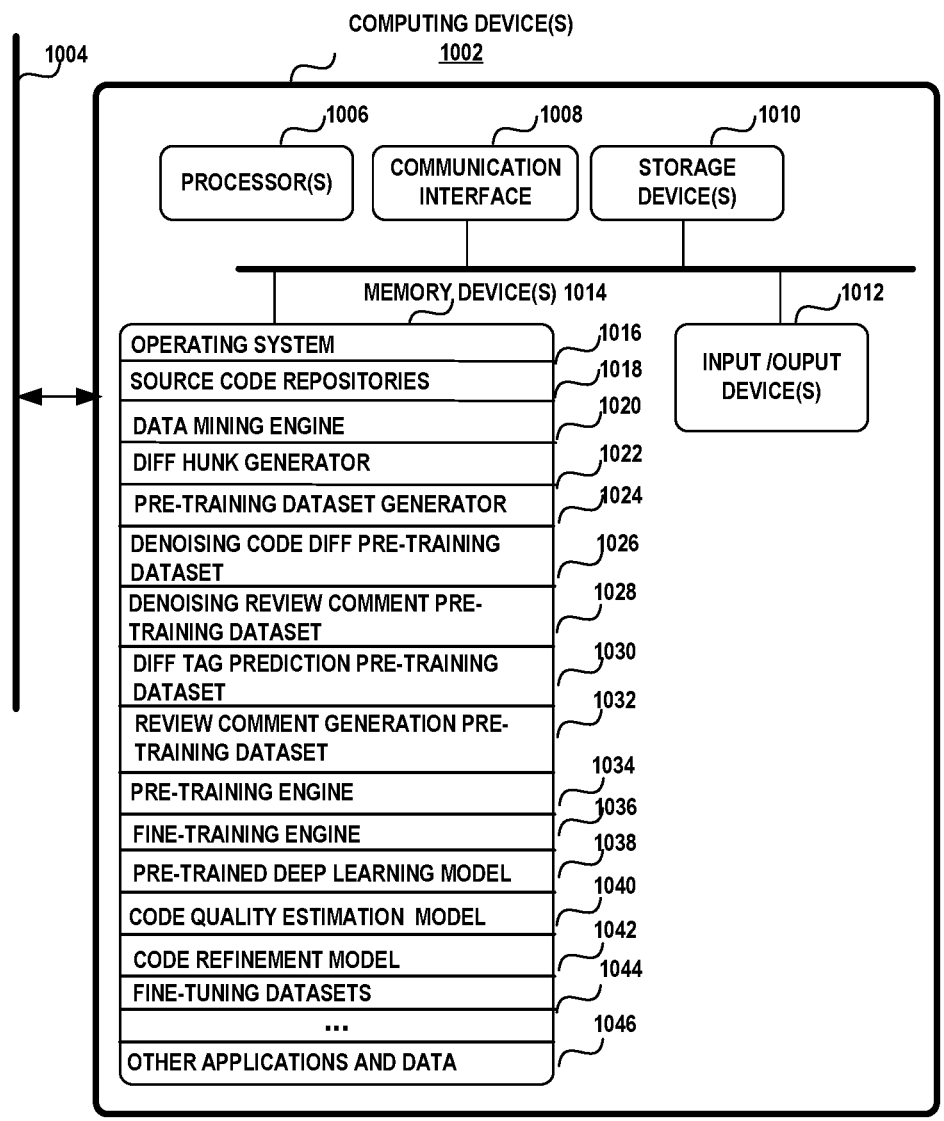
FIG. 10 is a block diagram illustrating an exemplary operating environment.

Attention now turns to a discussion of an exemplary operating environment 1000. FIG. 10 illustrates an exemplary operating environment 1000 in which one or more computing devices 1002 are used to develop the components of the code review automation system and utilize the code review automation system for the code review activities. However, it should be noted that the aspects disclosed herein is not constrained to any particular configuration of the computing devices. In another aspect, one or more computing devices may be configured to develop the components of the code review automation system and one or more other computing devices may be configured to utilize the code review automation system.

A computing device 1002 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1000 may be configured in a network environment, a distributed environment, a multi-processor environment, or a stand-alone computing device having access to remote or local storage devices.

A computing device 1002 may include one or more processors 1006, one or more communication interfaces 1008 one or more storage devices 1010, one or more memory devices or memories 1014, and one or more input/output devices 1012. A processor 1006 may be any commercially available or customized processor and may include dual microprocessors and multi-processor architectures. A communication interface 1008 facilitates wired or wireless communications between the computing device 1002 and other devices. A storage device 1010 may be computer-readable medium that does not contain propagating signals, such as modulated data signals transmitted through a carrier wave. Examples of a storage device 1010 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1010 in the computing devices 1002. The input/output devices 1012 may include a keyboard, mouse, pen, voice input device, touch input device, display, speakers, printers, etc., and any combination thereof.

A memory device or memory 1014 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 810, 850 may also include one or more external storage devices or remotely located storage devices that do not pertain to propagated signals, such as modulated data signals transmitted through a carrier wave.

A memory device 1014 may contain instructions, components, and data. A component is a software program that performs a specific function and is otherwise known as a module, program, and/or application. The memory device 1014 may include an operating system 1016, source code repositories 1018, a data mining engine 1020, a diff hunk generator 1022, a pre-training dataset generator 1024, a denoising code diff pre-training dataset 1026, a denoising review comment pre-training dataset 1028, a diff tag prediction pre-training dataset 1030, a review comment generation pre-training dataset 1032, a pre-training engine 1034, a fine-tuning engine 1036, a pre-trained deep learning model 1038, a code quality estimation model 1040, a code refinement model 1042, fine-tuning datasets 1044 and other applications and data 1046.

A computing device 1002 may be communicatively coupled via a network 1004. The network 1004 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1004 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of automating code review activities using a deep learning model. The technical features associated with addressing this problem include pre-training a deep learning model with a large scale of unsupervised data derived from various code review tasks and the use of the code diff format for the unsupervised pre-training data.

The technical effect achieved is the enhanced accuracy of several code review activities, such as code quality estimation, code review generation, and refined code generation, without undue increased computational burden.

Conclusion

A system is described comprising a processor and a memory. The memory stores a program configured to be executed by the processor. The program comprises instructions that when executed by the processor performs actions that: obtain a plurality of code change snippets in a code diff format and a plurality of code reviews, wherein select ones of the code change snippets are associated with a code review, wherein the code diff format includes a tag representing an edit; construct a first plurality of pre-training samples from the plurality of code change snippets and a second plurality of pre-training samples from the plurality of code reviews, wherein the first plurality of pre-training samples includes lines of source code in the code diff format with surrounding context, wherein the second plurality of pre-training samples includes tokens of the code review; randomly denoise the lines of source code in the code change snippet of the first plurality of pre-training samples, the tags in the code change snippet of the first plurality of pre-training samples and the tokens in the code reviews of the second plurality of pre-training samples; and generate a code review deep learning model through pre-training a deep learning model with the first plurality of pre-training samples and the second plurality of pre-training samples, wherein the code review deep learning model learns to predict a code review given an input code change snippet with surrounding context in the code diff format.

In an aspect, the program comprises instructions that when executed by the processor performs actions that: obtain a fine-tuning dataset including a plurality of triplets, wherein a triplet includes an original source code snippet, an associated code review, and code change snippet, wherein the code change snippet is derived from application of the associated code review to the original source code snippet; and generate a code refinement model by fine-tuning the pre-trained deep learning model with the fine-tuning dataset, wherein the code refinement model generates refined code given an input original source code snippet and a corresponding code review.

In an aspect, the code refinement model is a neural transformer model having at least one encoder block and at least one decoder block.

In an aspect, the deep learning model includes a neural transformer model with attention having at least one encoder block and at least one decoder block.

In an aspect, the program comprises instructions that when executed by the processor performs actions that: construct a fine-tuning dataset including a plurality of fine-tuning samples, each fine-tuning sample including a code diff hunk and an associated label; and generate a code diff estimation model using the at least one encoder block of the pre-trained deep learning model trained on the fine-tuning dataset, wherein the code diff estimation model predicts whether or not an input code diff hunk needs a code review.

In an aspect, the program comprises instructions that when executed by the processor performs actions that: deploy the pre-trained deep learning model in a version-controlled source code repository to automate code review.

A computer-implemented method is disclosed, comprising: searching a source repository for a plurality of code change snippets and a plurality of code reviews, one or more of the plurality of code reviews associated with select ones of the code change snippets; obtaining each of the plurality of code change snippets in a code diff format, wherein the code diff format includes one or more tags, wherein a tag represents an edit made to an original code associated with the code change snippet; transforming each of the plurality of code change snippets into a code diff hunk, wherein the code diff hunk includes changed code and surrounding context; randomly denoising each of the code diff hunks and each of the plurality of code reviews; and generating a pre-trained deep learning model from the randomly denoised code change snippets and the randomly denoised code reviews, wherein the pre-trained deep learning model predicts a code review given an input code diff hunk.

In an aspect, the computer-implemented method further comprises prior to randomly denoising each of the plurality of code change snippets and each of the plurality of code reviews, transforming each of the one or more tags into a special token, wherein the special token represents a specific edit.

In an aspect, randomly denoising each of the plurality of code change snippets and each of the plurality of code reviews further comprises: randomly denoising the one or more tags associated with each of the plurality of code change snippets.

In an aspect, randomly denoising each of the plurality of code change snippets and each of the plurality of code reviews further comprises: randomly denoising tokens associated with each of the plurality of code reviews.

In an aspect, randomly denoising each of the plurality of code change snippets and each of the plurality of code reviews further comprises: randomly denoising lines of source code in each of the plurality of code change snippets.

In an aspect, the pre-trained deep learning model includes a neural transformer model with attention including at least one encoder block and at least one decoder block.

In an aspect, the computer-implemented method further comprises: training the at least one encoder block of the pre-trained deep learning model with a fine-tuning dataset to generate a code quality estimation model, wherein the fine-tuning dataset includes samples of code diff hunks with a label, wherein the label indicates whether a code review is needed for the code diff hunk, wherein the code quality estimation model predicts a label for a given code diff hunk.

In an aspect, the computer-implemented method further comprises: training the pre-trained deep learning model with a fine-tuning dataset to generate a code refinement model, wherein the fine-tuning dataset includes samples of original source code and an associated code review, wherein the code refinement model predicts a code review given an input original source code and a corresponding code review.

In an aspect, the surrounding context includes one or more lines of source code surrounding changed code that have not been changed.

Another computer-implemented method is disclosed comprising: constructing a plurality of code diff samples from a plurality of changed source code, wherein a code diff sample is represented in a code diff format, wherein the code diff format includes one or more tags, wherein a tag represents a difference between an original code associated with the changed source code and the changed source code; constructing a plurality of review comment samples from a plurality of code reviews of changed source code; and generating a code review deep learning model by training a deep learning model with the plurality of code diff samples and the plurality of review comment samples, wherein the code review deep learning model generates a code review given an input code diff hunk.

In an aspect, the computer-implemented method further comprises: generating a code refinement model from the code review deep learning model using a fine-tuning dataset consisting of a plurality of pairs, a pair including an original source code snippet and a corresponding code review.

In an aspect, the code review deep learning model is a neural transformer model with attention having a plurality of encoder blocks and a plurality of decoder blocks.

In an aspect, the computer-implemented method further comprises: generating a code quality estimation model by training the code review deep learning model with a fine-tuning dataset, wherein the fine-tuning dataset includes a plurality of pairs of a code diff hunk and an associated label.

In an aspect, the computer-implemented method further comprises: deploying the code review deep learning model in a version-controlled source code repository.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A computer-implemented method, comprising:
   searching a source repository for a plurality of code change snippets and a plurality of code reviews, one or more of the plurality of code reviews associated with select ones of the code change snippets;
   obtaining each of the plurality of code change snippets in a code diff format, wherein the code diff format includes one or more tags, wherein a tag represents an edit made to an original code associated with a select code change snippet of the plurality of code change snippets;
   transforming each of the plurality of code change snippets into a code diff hunk, wherein the code diff hunk includes changed code and surrounding context;
   randomly denoising each of the code diff hunks of the plurality of code change snippets and each of the plurality of code reviews; and
   generating a pre-trained deep learning model from the randomly denoised code diff hunks of the plurality of code change snippets and the randomly denoised code reviews, wherein the pre-trained deep learning model predicts a code review given an input code diff hunk.

2. The computer-implemented method of claim 1, prior to randomly denoising each of the code diff hunks of the plurality of code change snippets and each of the plurality of code reviews, transforming each of the one or more tags into a special token, wherein the special token represents a specific edit.

3. The computer-implemented method of claim 1, wherein randomly denoising each of the code diff hunks of the plurality of code change snippets and each of the plurality of code reviews further comprises:
   randomly denoising the one or more tags associated with each of the plurality of code change snippets.

4. The computer-implemented method of claim 1, wherein randomly denoising each of the code diff hunks of the plurality of code change snippets and each of the plurality of code reviews further comprises:
   randomly denoising tokens associated with each of the plurality of code reviews.

5. The computer-implemented method of claim 1, wherein randomly denoising each of the code diff hunks of the plurality of code change snippets and each of the plurality of code reviews further comprises:
   randomly denoising lines of source code in each of the plurality of code change snippets.

6. The computer-implemented method of claim 1, wherein the pre-trained deep learning model includes a neural transformer model with attention including at least one encoder block and at least one decoder block.

7. The computer-implemented method of claim 6, further comprising:
   training the at least one encoder block of the pre-trained deep learning model with a fine-tuning dataset to generate a code quality estimation model, wherein the fine-tuning dataset includes samples of code diff hunks with a label, wherein the label indicates whether a code review is needed for the code diff hunk, wherein the code quality estimation model predicts a label for a given code diff hunk.

8. The computer-implemented method of claim 1, further comprising:
   training the pre-trained deep learning model with a fine-tuning dataset to generate a code refinement model, wherein the fine-tuning dataset includes samples of original source code and an associated code review, wherein the code refinement model predicts a code review given an input original source code and a corresponding code review.

9. The computer-implemented method of claim 1, wherein the surrounding context includes one or more lines of source code surrounding changed code that have not been changed.

10. A system comprising:
    a processor and a memory;
    wherein the memory stores a program configured to be executed by the processor,
    wherein the program comprises instructions that when executed by the processor performs actions that:
    obtain a plurality of code change snippets in a code diff format and a plurality of code reviews, wherein select ones of the plurality of code change snippets are associated with a particular code review, wherein the code diff format includes at least one tag representing an edit;

construct a first plurality of pre-training samples from the plurality of code change snippets and a second plurality of pre-training samples from the plurality of code reviews, wherein each of the first plurality of pre-training samples includes lines of source code in the code diff format with a respective surrounding context, wherein each of the second plurality of pre-training samples includes tokens of a select code review of the plurality of code reviews;

randomly denoise the lines of source code in each of the code change snippets of the first plurality of pre-training samples, the at least one tag in each code change snippet of the first plurality of pre-training samples and the tokens of each code review of the plurality of code reviews of the second plurality of pre-training samples; and generate a code review deep learning model through pre-training a deep learning model with the first plurality of pre-training samples and the second plurality of pre-training samples, wherein the code review deep learning model learns to generate a particular code review given an input code change snippet with an associated surrounding context in the code diff format.

11. The system of claim 10, wherein the program comprises instructions that when executed by the processor performs actions that:
obtain a fine-tuning dataset including a plurality of triplets, wherein a triplet includes an original source code snippet, an associated code review, and a corresponding code change snippet, wherein the corresponding code change snippet is derived from application of the associated code review to the original source code snippet; and
generate a code refinement model by fine-tuning the pre-trained deep learning model with the fine-tuning dataset, wherein the code refinement model generates refined code given an input original source code snippet and a corresponding code review.

12. The system of claim 11, wherein the code refinement model is a neural transformer model having at least one encoder block and at least one decoder block.

13. The system of claim 10, wherein the deep learning model includes a neural transformer model with attention having at least one encoder block and at least one decoder block.

14. The system of claim 13, wherein the program comprises instructions that when executed by the processor performs actions that:
construct a fine-tuning dataset including a plurality of fine-tuning samples, each fine-tuning sample including a code diff hunk and an associated label; and
generate a code diff estimation model using the at least one encoder block of the pre-trained deep learning model trained on the fine-tuning dataset, wherein the code diff estimation model predicts whether or not an input code diff hunk needs an associated code review.

15. The system of claim 10, wherein the program comprises instructions that when executed by the processor performs actions that:
deploy the pre-trained deep learning model in a version-controlled source code repository to automate code review.

16. A hardware storage device having stored thereon computer executable instructions that are structured to be executable by a processor of a computing device to thereby cause the computing device to perform actions that:
obtain a plurality of code change snippets in a code diff format and a plurality of code reviews, wherein select ones of the plurality of code change snippets are associated with a particular code review, wherein the code diff format includes at least one tag representing an edit;
construct a first plurality of pre-training samples from the plurality of code change snippets and a second plurality of pre-training samples from the plurality of code reviews, wherein the first plurality of pre-training samples includes lines of source code in the code diff format with a respective surrounding context, wherein the second plurality of pre-training samples includes tokens of each code review of the plurality of code reviews;
randomly denoise the lines of source code in each of the code change snippets of the first plurality of pre-training samples, the at least one tag in each code change snippet of the first plurality of pre-training samples and the tokens of each code review of the plurality of code reviews of the second plurality of pre-training samples; and
train a deep learning model to learn to generate a code review, when given an input code change snippet with an associated surrounding context in the code diff format, with the first plurality of pre-training samples and the second plurality of pre-training samples.

17. The hardware storage device of claim 16 having stored thereon computer executable instructions that are structured to be executable by the processor of the computing device to thereby cause the computing device to perform actions that:
obtain a fine-tuning dataset including a plurality of triplets, wherein a triplet includes an original source code snippet, an associated code review, and a corresponding code change snippet, wherein the corresponding code change snippet is derived from application of the associated code review to the original source code snippet; and
fine-tune the deep learning model with the fine-tuning dataset for the deep learning model to learn to generate refined source code for a given original source code snippet and a given related code review.

18. The hardware storage device of claim 16 having stored thereon computer executable instructions that are structured to be executable by the processor of the computing device to thereby cause the computing device to perform actions that:
generate a fine-tuning dataset comprising a plurality of fine-tuning samples, wherein a fine-tuning sample comprises a code diff hunk and an associated label; and
train at least one encoder block of the deep learning model with the fine-tuning dataset to learn to determine whether or not an input code diff hunk needs a code review.

19. The hardware storage device of claim 16, wherein the deep learning model comprises a neural transformer model with attention.

* * * * *